United States Patent
Nakazawa et al.

(10) Patent No.: US 7,056,972 B2
(45) Date of Patent: Jun. 6, 2006

(54) COMPOSITION CONTAINING STIMULI-RESPONSIVE POLYMER, INK COMPOSITION CONTAINING IT, AND IMAGE-FORMING METHOD AND APPARATUS USING THE INK COMPOSITION

(75) Inventors: Ikuo Nakazawa, Kanagawa (JP); Koichi Sato, Kanagawa (JP); Sakae Suda, Kanagawa (JP); Masayuki Ikegami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 411 days.

(21) Appl. No.: 10/100,913

(22) Filed: Mar. 20, 2002

(65) Prior Publication Data
US 2002/0186288 A1    Dec. 12, 2002

(30) Foreign Application Priority Data
Mar. 23, 2001  (JP)  ............................... 2001-086239
Jul. 10, 2001   (JP)  ............................... 2001-209923
Mar. 18, 2002  (JP)  ............................... 2002-074975

(51) Int. Cl.
    *C08L 53/00*    (2006.01)
(52) U.S. Cl. ..................................................... 524/505
(58) Field of Classification Search ................ 523/160, 523/161, 332, 333; 524/504, 505, 612; 526/332, 526/333
    See application file for complete search history.

(56) References Cited

U.S. PATENT DOCUMENTS

| | | | |
|---|---|---|---|
| 3,062,892 A | 11/1962 | Schneider ................... 260/609 |
| 4,246,154 A * | 1/1981 | Yao ............................. 524/88 |
| 4,313,124 A | 1/1982 | Hara ...................... 346/140 R |
| 4,345,262 A | 8/1982 | Shirato et al. .......... 346/140 R |
| 4,459,600 A | 7/1984 | Sato et al. ............... 346/140 R |
| 4,463,359 A | 7/1984 | Ayata et al. ................. 346/1.1 |
| 4,558,333 A | 12/1985 | Sugitani et al. ......... 346/140 R |
| 4,723,129 A | 2/1988 | Endo et al. .................. 346/1.1 |
| 4,740,796 A | 4/1988 | Endo et al. .................. 346/1.1 |
| 5,085,698 A | 2/1992 | Ma et al. ...................... 106/20 |
| 5,139,574 A * | 8/1992 | Winnik et al. ................ 524/84 |
| 5,145,518 A | 9/1992 | Winnik et al. ................ 106/21 |
| 5,252,318 A * | 10/1993 | Joshi et al. .............. 424/78.04 |
| 5,320,668 A * | 6/1994 | Shields et al. ........... 106/31.28 |
| 5,633,109 A | 5/1997 | Jennings et al. ............. 430/115 |
| 5,722,322 A * | 3/1998 | Watanabe .................... 101/129 |
| 5,844,039 A * | 12/1998 | Scranton et al. ............. 524/530 |
| 6,287,485 B1 | 9/2001 | Akashi et al. ............... 252/583 |
| 6,391,923 B1 * | 5/2002 | Pollmann et al. ........... 514/714 |
| 6,486,213 B1 * | 11/2002 | Chen et al. ............... 514/772.1 |
| 6,616,946 B1 * | 9/2003 | Meier et al. ................. 424/489 |
| 2001/0018472 A1 * | 8/2001 | Parazak et al. ............. 523/160 |
| 2003/0092776 A1 * | 5/2003 | Ron et al. ................. 514/772.6 |
| 2003/0153649 A1 * | 8/2003 | Bromberg ................... 523/160 |

FOREIGN PATENT DOCUMENTS

| | | |
|---|---|---|
| EP | 0-703087 A2 | 3/1996 |
| EP | 0 776 951 A2 | 4/1997 |
| EP | 1 072 956 A2 | 1/2001 |
| EP | 1 184 427 A2 | 3/2002 |
| JP | 59-123670 A | 7/1984 |
| JP | 59-138461 A | 8/1984 |
| JP | 61-7948 B2 | 3/1986 |
| JP | 64-63185 A | 3/1989 |
| JP | 3-237426 A | 10/1991 |
| JP | 5-148442 | 6/1993 |
| JP | 6-116330 | 4/1994 |
| JP | 8-82809 A | 3/1996 |
| JP | 8-216392 A | 8/1996 |
| JP | 11-80221 A | 3/1999 |
| JP | 11-189624 | 7/1999 |
| JP | 11-236523 | 8/1999 |
| JP | 11-236559 | 8/1999 |
| JP | 11-322866 A | 11/1999 |
| JP | 11-322942 A | 11/1999 |
| JP | 2001-72728 | 3/2001 |

* cited by examiner

*Primary Examiner*—Callie Shosho
(74) *Attorney, Agent, or Firm*—Fitzpatrick, Cella, Harper & Scinto

(57) ABSTRACT

The present invention relates to a stimuli-responsive composition that contains a polymer, a solvent and a substance having a predetermined function. One embodiment of the composition contains a block polymer, a solvent and a substance having a predetermined function. Preferably, the solvent in the composition is water; and the polymer in the composition has a polyvinyl ether structure. The composition has superior dispersion stability. The present invention also relates to an ink composition containing the composition, an image-forming method and an image-forming apparatus using the ink composition, and a recording medium having the composition.

10 Claims, 1 Drawing Sheet

COMPOSITION CONTAINING STIMULI-RESPONSIVE POLYMER, INK COMPOSITION CONTAINING IT, AND IMAGE-FORMING METHOD AND APPARATUS USING THE INK COMPOSITION

This application is based on Japanese Patent Application Nos. 2001-086239 filed Mar. 23, 2001, 2001-209923 filed Jul. 10, 2001, and 2002-074975 filed Mar. 18, 2002, the contents of which are incorporated hereinto by reference.

BACKGROUND OF THE INVENTION

1. Field of the Invention

The present invention relates to a stimuli-responsive composition which contains a polymer, a solvent and a substance having a predetermined function, and which is usable for various functional materials. In particular, the present invention relates to an image-forming material of good dispersion stability, which comprises an aqueous dispersion of the composition and which is favorable for printers and displays, and to an image-forming method and an image-forming apparatus using it.

2. Description of the Related Art

Aqueous dispersions containing solid particles have heretofore been known for functional materials, typically including, for example, agricultural chemicals such as herbicides and insecticides, medicines such as carcinostatic agents, antiallergic agents and anti-inflammatory agents, and coloring materials such as inks that contain colorants such as solid particles and toner. The recent development in digital printing technology is remarkable. Typical examples of digital printing technology are a technology of electrophotography and inkjet recording, and recently, their status in office-use and household-use image-forming techniques is greatly increasing.

In particular, the technology of ink jet recording, as a direct recording method, has the characteristics of being compact and power-saving. Also, in inkjet recording technology, image quality is greatly enhanced by reduction of the size of the nozzle orifices. One example of such an inkjet recording technology includes a method in which ink supplied from an ink tank to a nozzle is heated by a heater on the nozzle to be vaporized and bubbled, and ink is thus ejected from the nozzle to form an image on a recording medium. Another example includes a method in which ink is ejected from a nozzle by vibrating a piezoelectric device. In these methods, an aqueous solution of dye is usually used. In this case, when a plurality of inks are applied, they may blur, and a phenomenon called feathering may occur along the direction of the fibers that constitute the paper at a recording point of a recording medium. To mitigate the phenomenon, use of pigmented ink has been investigated (for example, in U.S. Pat. No. 5,085,698). However, improvement in many points is desired.

The present invention is to provide a stimuli-responsive composition which contains a polymer, a solvent and a substance having a predetermined function. In particular, the present invention is to provide a pigment dispersion ink material in the composition in which the solvent is water and the substance having a predetermined function is a pigment, and which has the advantages of good dispersion stability, an improved blurring resistance and a feathering resistance, and an improved fixability.

SUMMARY OF THE INVENTION

The object mentioned above is attained by the present invention mentioned below.

The first aspect of the present invention is a stimuli-responsive composition which contains a polymer, a solvent and a substance having a predetermined function. The first embodiment of the first aspect of the present invention is a stimuli-responsive composition which contains a block polymer having at least two different hydrophilic blocks, a solvent and a substance having a predetermined function. The polymer changes its property by stimulation under the state of composition. In the present invention, the solvent is preferably water or an aqueous solvent. Also preferably, the polymer in the composition has a polyvinyl ether structure. Also preferably, the substance having a predetermined function is at least one of a pigment and a dye. Also preferably, the polymer having polyvinyl ether structure has an oxyalkylene structure in at least a part of the side chains of the polymer. In the composition of the present invention, the stimulation-responsiveness is phase change caused by stimulation. For example, the stimulation-responsiveness is a response caused by temperature change, and the temperature change falls in the range that covers the phase transition temperature of the composition and therearound. In the composition of the present invention, the stimulation-responsiveness may be a response caused by electromagnetic waves, and the wavelength range of the electromagnetic waves falls between 100 and 800 nm. In the composition of the present invention, the stimulation-responsiveness may be a response caused by pH change, and the range of pH change falls between pH 3 and pH 12. In the present invention, the stimulation-responsiveness may be a response caused by concentration change, and the concentration change falls in the range that covers the phase transition concentration of the composition and therearound. In the present invention, two or more such stimuli may be combined. Based on the stimulation-responsiveness of the composition, the dispersion stability of the substance having a predetermined function in the composition can be improved. For example, in case where the composition is an ink composition, even when a temperature is lowered owing to the external environmental change, the dispersibility of the substance therein can be kept stable, since the precipitate and deposition do not occur by an increased hydrophilicity of the polymer in the ink composition in accordance with the change.

Preferably, in the composition of the present invention, the polymer having polyvinyl ether structure is a copolymer, especially a block polymer or a block polymer having at least two different hydrophilic blocks; a graft polymer; or a gradient polymer. Also preferably, the polyvinyl ether structure of the polymer in the composition has a repeating unit of the structure —(CH$_2$—CH(OR$^1$)) in which R$^1$ is specifically defined herein. Also preferably, the solvent in the composition of the present invention is water or an aqueous solvent. Also preferably, the composition contains an additional polymer other than the polymer having polyvinyl ether structure. Also preferably, the composition further contains a surfactant.

The second aspect of the present invention is a stimuli-responsive ink composition, which contains the composition of the first aspect as above and in which the substance having a predetermined function is a dye or a pigment. Preferably, the ink composition of the present invention is an ink for inkjet recording.

The third aspect of the present invention is an image-forming method for recording an image on a recording medium by ejecting an ink from an ink-ejecting unit onto the recording medium, in which the ink is the stimuli-responsive ink composition of the present invention. In the image-forming method of the present invention, the stimuli-responsive ink composition may be contacted with a stimulating substance or composition, thereby fixing the ink composition on the recording medium to form an image thereon.

In the third aspect of the present invention, the stimulating substance or composition may be an ink composition. In one preferred embodiment of the image-forming method of this aspect, the stimuli-responsive ink composition that contains a block polymer, a solvent and a substance having a predetermined function is contacted with a composition that contains an additive capable of crosslinking with the block polymer (hereinafter this will be referred to as a crosslinking agent) as a composition that provides a stimulus to the ink composition, whereby the ink composition is fixed on the recording medium to form an image thereon.

Preferably, the block polymer in the ink composition is amphiphilic, and water is preferably used as the solvent. In this case, the block polymer forms micelles and disperses the pigment well. In that manner, since most of the block polymer do does not dissolve in a molecular state but disperses in a micelle state, the ink composition of the present invention shows relatively low viscosity. When the ink composition in which the block polymer forms micelles in that manner is contacted with the composition that contains a crosslinking agent capable of reacting with a part of the block polymer or capable of forming a complex with a part of the block polymer, the micelles of the block polymer form a network structure to increase the viscosity of the ink. Accordingly a preferred embodiment of the image-forming method of the present invention provides good image formation having a sufficient fixability. If the concentration of the crosslinking agent used is increased or if a polyfunctional crosslinking agent is used, the ink composition of the present invention can be changed to a gel.

For the preferred ink composition of the present invention, which contains a block polymer having a polyvinyl ether structure, a compound having a carboxyl functional group is preferably used as the crosslinking agent. Since the compound must function as a crosslinking agent, it is desirable that the compound has two or more carboxyl groups. More specifically, the compound includes dicarboxylic acids, tricarboxylic acids and polycarboxylic acids.

In the image-forming method of the present invention, preferably used is a composition that contains a polymer as component in which at least a part of the structure of the polymer changes from hydrophobic to hydrophilic at $20°$ C. or lower, and preferably at $10°$ C. or lower.

In the present invention, the stimulating substance or composition may be provided on a recording medium. One embodiment of the image-forming method of the third aspect of the present invention is an inkjet recording method that comprises ejecting the ink composition onto a recording medium by applying thermal energy thereto.

The fourth aspect of the present invention is an image-forming apparatus for recording an image on a recording medium by ejecting an ink from an ink-ejecting unit onto the medium, in which the ink is the stimuli-responsive ink composition of the present invention. The image-forming apparatus of the present invention has a means for contacting the stimuli-responsive ink composition with a stimulating substance or composition, thereby fixing the ink composition on a recording medium to form an image thereon.

In the image-forming apparatus of the present invention, the stimulating substance or composition may be an ink composition. In the apparatus of the present invention, the stimulating substance or composition may previously be provided on a recording medium. The image-forming apparatus of the present invention has a means for applying thermal energy to the ink thereby ejecting the ink onto a recording medium. In one preferred embodiment of the present invention, the image-forming apparatus of the present invention has a means for contacting the stimuli-responsive ink composition that contains a block polymer, a solvent and a substance having a predetermined function with a stimulating composition or composition that contains an additive (crosslinking agent) capable of crosslinking with the block polymer. By such contacting, the ink composition is fixed on a recording medium to form an image thereon.

The block polymer in the ink composition is preferably amphiphilic, and the solvent is preferably water. In this case, the block polymer forms micelles and disperses the pigment well. In that manner, since most block polymers do not dissolve in a molecular state but disperse in a micelle state, the ink composition of the present invention shows relatively low viscosity. When the ink composition in which the block polymer forms micelles in that manner is contacted with the composition that contains a crosslinking agent capable of reacting with a part of the block polymer or capable of forming a complex with the block polymer, the micelles of the block polymer form a network structure to increase the viscosity of the ink. Accordingly, the preferred embodiment of the image-forming apparatus of the present invention provides good image formation having a sufficient fixability. If the concentration of the crosslinking agent used is increased or if a polyfunctional crosslinking agent is used, the image-forming apparatus is provided which allows the ink composition of the present invention to be changed to a gel state.

For the preferred ink composition, which contains a block polymer having polyvinyl ether structure, a compound having a carboxyl functional group is preferably used as the crosslinking agent. Since the compound must function as a crosslinking agent, it is desirable that the compound has two or more carboxyl groups. More specifically, the compound includes dicarboxylic acids, tricarboxylic acids and polycarboxylic acids.

In the image-forming apparatus of the present invention, preferably used is a composition that contains a polymer as a component in which at least a part of the structure of the polymer changes from hydrophobic to hydrophilic at $25°$ C. or lower, and preferably at $20°$ C. or lower.

The fifth aspect of the present invention is a recording medium. The recording medium of the present invention receives ink that has been ejected from ink-ejecting unit, in which the ink is the stimuli-responsive ink composition of the present invention, and a stimulating substance or composition is provided on its surface.

The sixth aspect of the present invention is to provide a composition having good dispersion stability at a temperature of $20°$ C. or lower, preferably $10°$ C. or lower. In the composition of the present invention, a composition is used which contains a polymer as a component in which at least a part of the structure of the polymer changes from the state that is compatible with a solvent to the state that is incompatible to a solvent at a temperature $20°$ C. or lower, and preferably $10°$ C. or lower.

The present invention provides a functional composition and an aqueous dispersion of good dispersibility. The functional ink of the present invention and the image-forming method and apparatus of the present invention using the same provide image prints of good fixability.

The above and other objects, effects, features and advantages of the present invention will become more apparent from the following description of embodiments thereof taken in conjunction with the accompanying drawing.

DETAILED DESCRIPTION OF PREFERRED EMBODIMENTS

Figure 1:
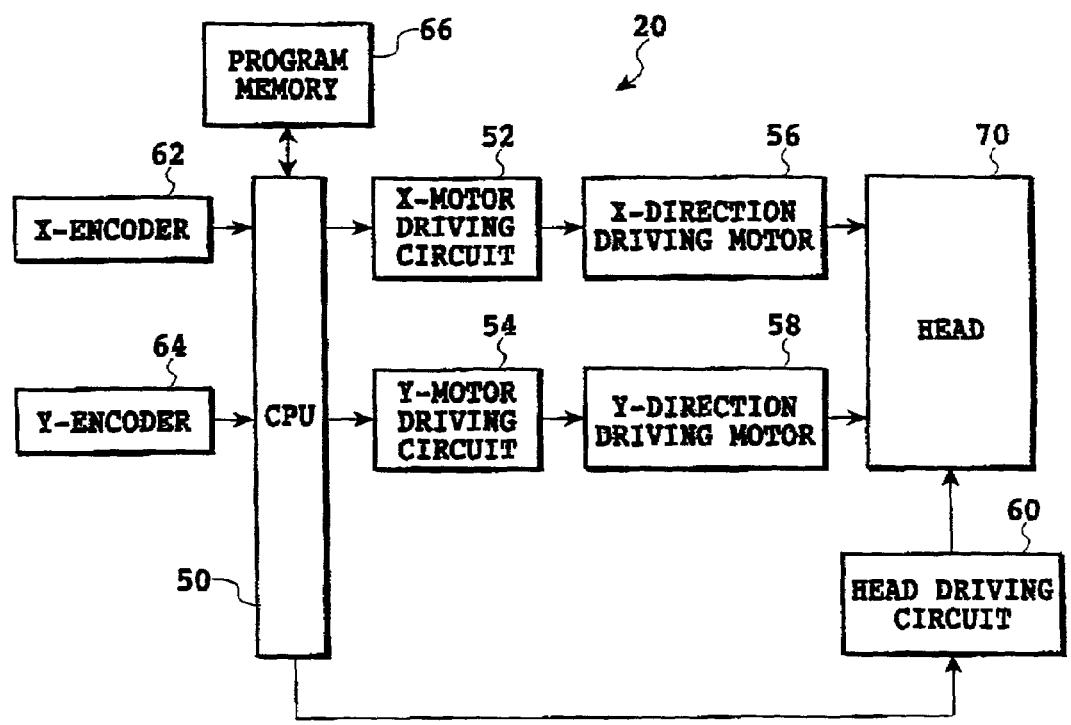
FIG. 1 illustrates a block diagram of an inkjet recording apparatus.

Having assiduously studied the background art and the problems noted above, the inventors have completed the present invention.

Specifically, the present invention is a stimuli-responsive composition which contains a polymer, a solvent and a substance having a predetermined function. In particular, the present invention is a stimuli-responsive composition which contains a block polymer having at least two different hydrophilic blocks, a solvent such as water or a dissolving medium, and a substance having a predetermined function such as solid particles (e.g., pigment) or a dye. In the present invention, it is preferable that the polymer contained in the composition has a polyvinyl ether structure.

The composition of the present invention is a functional material and contains a polymer, a solvent and a substance having a predetermined function. Typically, for example, it includes compositions usable in agricultural chemicals such as herbicides and insecticides: medicines such as carcinostatic agents, antiallergic agents and anti-inflammatory agents; cosmetics such as lipstick, foundation, rouge and moisture-retentive cream; and coloring materials such as colorant-containing ink and toner. A "substance having a predetermined function" used herein means a compound or a composition which is contained in the composition of the present invention, and exhibits the desired function. For example, in the agricultural chemicals mentioned above, the compound or the composition is a herbicidal compound or an insecticidal compound. In the medicines, the substance is a compound or a composition having the ability to relieve or remit the disease of the subject. In the field of cosmetics such as toilet articles, the substance is an essential ingredient of the desired product, i.e. for example, it is a compound having the moisture-retentive effect, if the product is a moisture-retentive cream. When the substance is used as coloring materials, it is a solid particle such as pigment, or a dye. The composition of the present invention contains a solvent. The solvent contained in the composition of the present invention is a medium having a property that allows the components contained in the composition to be dissolved, suspended or dispersed therein, and any medium can be used so long as it has the property. Concretely, for example, the solvent includes organic solvents such as various linear, branched or cyclic aliphatic hydrocarbons, aromatic hydrocarbons, heteroaromatic hydrocarbons and the like; aqueous solvents; and water. Especially preferred for the composition of the present invention are water and aqueous solvents. Examples for the aqueous solvents are polyalcohols such as ethylene glycol, diethylene glycol, triethylene glycol, polyethylene glycol, propylene glycol, polypropylene glycol, glycerin and the like; polyalcohol ethers such as ethylene glycol monomethyl ether, ethylene glycol monoethyl ether, ethylene glycol monobutyl ether, diethylene glycol monoethyl ether, diethylene glycol monobutyl ether and the like; and nitrogen-containing solvents such as N-methyl-2-pyrrolidone, substituted pyrrolidones, triethanolamine and the like. For the solvent in ink, usable are monohydric alcohols such as methanol, ethanol and isopropyl alcohol for accelerating the drying speed of the ink on paper.

The composition of the present invention is characterized in that it responds to such stimulation to change its properties. Based on this characteristic, the composition can be used in various specific medicines cosmetics and coloring materials. For example, in medicines, the composition can release a pharmaceutically-active ingredient when it has reached the organ where the ingredient should exhibit its effect. In cosmetics, for example, the composition can change its properties immediately after being applied to the skin, thereby to give a function to the cosmetics which increase a holding effect of the cosmetics on skin and is unlikely to change color on the skin. Especially preferably, the composition is used in coloring materials that change their properties when exposed to stimuli. In the case where the composition of the present invention is used in a pigment dispersion ink material, it provides a good dispersion stability of pigment, whereby blurring and feathering of the pigment dispersion ink material can be improved, and the composition can be used for the pigment dispersion ink material having good fixability. Accordingly, the pigment dispersion ink material that is the composition of the present invention is used as an image-forming material which provides high-quality imaging, energy-saving, and high-speed image formation. In this case, the colorant in the ink material may be a dye.

Responding to such stimulation, the composition of the present invention changes its condition (properties). For example, its condition change includes a phase change from sol state to gel state, a phase change from liquid state to solid state, and a change of chemical structure. The stimulation includes, for example, temperature change, application of electric field, exposure to light (electromagnetic waves) such as UV radiation, visible light or infrared radiation, pH change of the composition, addition of chemical substance, and concentration change of the composition. The stimulation-responsiveness referred to herein means that the composition of the present invention responds to the stimulation as above and changes its properties. Specifically, the stimulation-responsiveness means that, when the composition is exposed to stimulation such as exposure to electromagnetic waves, application of electric field, temperature change, pH change, addition of chemical substance or concentration change, the morphology and the physical properties of the composition significantly change in response to the stimulation (environmental changes). The changes of the properties may be suitably selected in accordance with the object of use of the composition of the present invention. In the present intention, the function of stimulation-responsiveness is achieved by the polymer as mentioned below. In medicines, for example, the property change includes the change of the chemical structure, especially the chemical bond, by stimulation, which may release the substance having a predetermined function. In cosmetics, the property change includes the phase condition change of the composition by stimulation, by which a volatilization of the substance having a predetermined function is prevented. In coloring materials, the property change includes the phase change (e.g., a change from sol to gel) of the composition exposed to some stimuli, and the fixability of the composition on recording media is enhanced. The preferred stimulation-responsiveness in the present invention is mentioned below. The first is stimulation-responsiveness to temperature change. The range of the temperature change covers the phase transition temperature of the composition and therearound. In the composition of the present invention, the stimulation-responsiveness is a response caused by an exposure to electromagnetic waves, and the wavelength range of the electromagnetic waves preferably falls between 100 and 800 nm. In the composition of the present invention, the stimulation-responsiveness is a response caused by pH change, and the range of the pH change preferably falls between pH 3 and pH 12. The stimulation-responsiveness of the composition of the present invention further includes a response caused by its concentration change. An example of the stimulation includes a change of the concentration of the composition caused by the evaporation or absorption of solvent in the composition, or by the change of the concentration of the polymer dissolved in the composition. It is desirable that, in such stimulation, the concentration change falls around a range in which the composition undergoes phase transition. In the present invention at least two of these stimuli may be combined.

As mentioned above, the composition of the present invention has many applications for agricultural chemicals, medicines, cosmetics and coloring materials and the like, but is preferably used in an ink material that contains water or any other solvent. Containing the composition of the present invention, the properties such as the fixability of the ink material can be improved.

The reason why the stimuli-responsive composition of the present invention, which contains a polymer, a solvent and a substance having a predetermined function, is favorable for the application mentioned above is because the polymer used in the composition disperses the substance having a predetermined function in the solvent well. In the composition, the polymer shall have compatibility with the solvent used. In particular, the polymer in the composition is preferably a copolymer, more preferably a block polymer.

The polymer, especially the block polymer, contained in the composition of the present invention can almost completely retain the properties of the repeat unit constructed from blocks or units, and the properties are exhibited while each property coexists. In particular, in the block polymer, the stimuli-responsive blocks or units effectively function, and the block polymer exhibits its function more efficiently compared with a random polymer. The block polymer for use in the present invention may be any known one, including, for example, acrylic or methacrylic block polymers: block polymers of polystyrene with poly condensation block polymers of polystyrene with addition polymers or polycondensation polymers; and block polymers having blocks of polyoxyethylene or polyoxyalkylene. In one preferred embodiment of the present invention, a block polymer having a polyvinyl ether structure, which will be described below, is preferably used. Also preferred for use in the present invention are graft polymers or gradient polymers having a polyvinyl ether structure.

Preferably, the block polymer for use in the present invention has at least two different hydrophilic blocks. The term "different" referred to herein means that the blocks have different chemical structures, that is, they differ in the monomer structure, in the branch structure of the polymer chain, or the like; and the term does not mean the difference in only the molecular chain length of the individual repeating units in the polymer chain. At least one hydrophilic block of those two or more different blocks of the polymer responds to stimulation, i.e. for example, the property of the block is changed from hydrophilic to hydrophobic, and the property of the composition is thereby altered. On the contrary, a block responds to stimulation, a hydrophobic property in a certain condition will be changed to a hydrophilic property, and the property of the composition is thereby altered. One preferred example of the stimulation-responsiveness of such block polymers includes the response that, when the polymer contained in the composition of the present invention is a block polymer having plural blocks, at least two of the plural blocks are hydrophilic blocks (in the present invention, the hydrophilic blocks mean that they are still hydrophilic even after being exposed to stimulation, or become hydrophilic after the exposure to stimulation), and at least one of them is responsive to stimulation and at least one of the others is always hydrophilic under the conditions that are used. In the case where the stimuli-responsive blocks are hydrophobic under a certain condition, and the composition is in micelles having a low viscosity if the stimulation is applied to the composition, the stimuli-responsive blocks are changed to hydrophilic by the stimulation to allow the composition to change from a dispersed solution having a low viscosity to a polymer solution having a high viscosity due to association of the polymer. In that manner, the composition of the present invention changes its properties due to a certain stimulus.

Another example of the composition of the present invention is an aqueous composition, in which the polymer is a block polymer as in the above and the stimuli-responsive blocks of the block polymer are hydrophilic in a certain condition. In such aqueous composition, when the composition is stimulated under the condition in which the polymer is dissolved in aqueous solution, the stimuli-responsive polymer blocks change to hydrophobic, whereby the composition is gelled while remaining micelle state to drastically increase its viscosity.

In still another example of the composition, the present invention includes a composition using a block polymer that consists of three different types of blocks, a hydrophobic block A, a stimuli-responsive block B and a hydrophilic block C. This example is the case where the composition is a micelle dispersion of AB cores under the water-dispersed condition under which the stimuli-responsive block B is hydrophobic, and when the composition is exposed to stimuli, block B is changed to hydrophilic to form micelles so that the core is block A, whereby the composition is gelled owing to the change of interaction between the micelles to drastically increase its viscosity.

As mentioned above, when the composition contains a block polymer having at least two different hydrophilic blocks, an extremely good stimulation-responsiveness can be realized by using water as a solvent.

From the viewpoint of the molecular design as mentioned above, the block configuration of the block polymer to be used in the present invention is preferably AB, ABA, ABC, ABCD (D is a block, the structure of which differs from those of A, B and C, and it may be hydrophilic or hydrophobic), or ABCA.

As mentioned above, the composition of the present invention encompasses different embodiments. One preferred embodiment of the composition of the present invention is a stimuli-responsive, aqueous dispersion that contains a polymer having a polyvinyl ether structure, water, and a solid particle. The aqueous dispersion of the present invention is a functional material, containing water and a solid particle. Typically as above, it is used as agricultural chemicals such as herbicides and insecticides, medicines such as carcinostatic agents, antiallergic agents and anti-inflammatory agents, and coloring materials such as ink that contain colorants as solid particles and toner. Especially preferably, the composition is used as coloring materials that change their properties when exposed to stimuli. Using the aqueous dispersion of this embodiment, a dispersion stability of the solid particle (e.g., pigment) is enhanced, whereby blurring and feathering is improved, and a pigment dispersion ink material having a sufficient fixability is provided. Accordingly, the aqueous dispersion of the present invention can be used for an image-forming material which can realize high-quality, energy-saving, high-speed image formation.

The solid particle referred to herein means a compound of solid state among the substance having a predetermined function as mentioned above. One preferred embodiment of the compound is a substance of a solid particle such as pigment.

The aqueous dispersion of the present invention used in the applications as mentioned above contains a polymer, especially a polymer having polyvinyl ether structure, water and a solid particle, whereby the dispersion stability of the solid particle (e.g., pigment) is enhanced, and the property of the aqueous dispersion is changed by stimulation, and blurring and feathering is improved. Accordingly, the aqueous dispersion of the present invention exhibits a good image fixation. Therefore, it may be favorable to use as ink for inkjet printers.

As mentioned above, the composition of the present invention may contain various types of polymer, solvent, and substance having a predetermined function. The aqueous dispersion as mentioned above that is a specially preferred embodiment of the composition will be described in detail below. In the description of the preferred embodiment, a pigment is used as the solid particle (however, there is the case where the term "solid particle" is used as the general term). It should be noted that the present invention is not limited to the elements.

First, polyvinyl ether which is specifically used in the present invention is described. The characteristic feature of the aqueous dispersion of the present invention, which ensures improved dispersion stability of pigment, decreased blurring and feathering, and improved image fixability is significantly owing to a polymer material containing the polymer having polyvinyl ether structure used in the dispersion. As mentioned above, the stimulation-responsiveness of the present invention means that the dispersion significantly changes its morphology and physical properties by stimulation such as electromagnetic waves, application of electric field, temperature change, pH change, addition of chemical substance or concentration change of the composition, i.e., in accordance with such stimulation (environmental change). The polymer having polyvinyl ether structure can impart a stimuli-responsive feature to the dispersion. In the aqueous dispersion of this embodiment, it is preferable that the polymer also has a function of enhancing the dispersion stability of pigment or the like. Therefore, it is preferable that the polyvinyl ether has a structure which has both hydrophilic segments and hydrophobic segments, a so-called amphiphilic structure. Specifically, one preferred example of the polymer is a copolymer comprising a hydrophilic monomer and a hydrophobic monomer. The polymer having polyvinyl ether structure of this type has more preferable dispersibility, since the polyvinyl ether structure generally has a low glass transition point and has flexible property, thereby having compatible points where the hydrophobic segments are physically entangled with solid particles and are easy to be compatible with them.

Many reports have been made, regarding synthesis of polymers having polyvinyl ether structures (for example, JP-A 080221/1999). The typical method is cation living polymerization described by Aoshima et al. (JP-A 322942/1999, JP-A 322866/1999). The synthetic method of the polymer using cation living polymerization gives various polymers such as homopolers and copolymers comprising two or more different components, as well as block polymers, graft polymers and gradient polymers, with a uniform length (molecular weight) accurately. Polyvinyl ethers may have various functional groups introduced into the side chains thereof. The cation polymerization method may also be effected in an $HI/I_2$ or $HCl/SnCl_4$ system or the like.

The primary object of the polymer having polyvinyl ether structure used in the present invention is to impart the stimuli-responsive feature to the composition by addition of the polymer, but in addition, the polymer may impart any other functions (for example, a function of enhancing the dispersibility of solid particles such as pigment).

The stimulation to be applied to the aqueous dispersion that contains the polymer having polyvinyl ether structure, water and a solid particle includes, not limited to, preferably, exposure to electromagnetic waves, addition of electric field, temperature change, pH change, addition of chemical substance, the concentration change of the aqueous dispersion, or irradiation of electron radiation, as mentioned above. The exposure to electromagnetic waves, temperature change, pH change, or concentration change of the aqueous dispersion are more preferable. The exposure to electromagnetic waves referred to herein means that the aqueous dispersion is exposed to light such as UV radiation, visible light or IR radiation.

Typical examples of the above-mentioned stimulation are described below, and the polymer having polyvinyl ether structures responsive to such stimulation are exemplified below.

Response to stimulation of temperature change includes a change of the aqueous dispersion caused by change of solubility, thermal polymerization, polarity, or phase transition (sol-gel transition, liquid crystallization) or the like. The temperature change preferably falls within the phase transition temperature and therearound of the aqueous dispersion that contains a polymer having polyvinyl ether structure, water, and a solid particle such as pigment, more preferably it falls within the critical gelling temperature and therearound of the aqueous dispersion. The polyvinyl ether structure responsive to the stimulation of temperature change includes, for example, alkoxyvinyl ether derivatives such as poly(2-methoxyethyl vinyl ether) and poly(2-ethoxyethyl vinyl ether), or copolymers which contain such polymer compounds as a main ingredient. Especially, block polymers of poly((2-methoxyethyl vinyl ether)-b-(2-ethoxyethyl vinyl ether)) undergo rapid viscosity change at 20° C. by preparing it as block polymer. "b" in poly((2-methoxyethyl vinylether)-b-(2-ethoxyethylvinyl ether)) is an abbreviation indicating a block polymer.

The next example of stimulation-responsiveness is exposure to electromagnetic waves. Preferably, the wavelength range of the electromagnetic waves falls between 100 and 800 nm. In a stimulation response caused by the exposure of electromagnetic waves, the aqueous dispersion changes solubility, photopolymerization, photochromism, optical isomerization, optical dimerization, or phase transition (sol-gel transition, liquid crystallization). The polyvinyl ether structure responsive to the stimulation includes, for example, vinyl ether derivatives having a polymeric functional group such as poly(2-hydroxyethyl methacrylate), or copolymers which contain such polymer compounds as a main ingredient.

Regarding the response to the stimulation of pH change, the aqueous dispersion is preferably responsive to pH change in the range between pH 3 and pH 12. Response caused by the pH change includes, for example, solubility, hydrogen bond and coordinate bond, change of polarity, or phase transition (sol-gel transition, liquid crystallization). Examples of the polymer having polyvinyl ether structure contained in the dispersion responsive to the stimulation are copolymers or polymer blends of alkoxyvinyl ether derivatives such as poly(2-methoxyethyl vinyl ether), poly(2-ethoxyethyl vinyl ether) and the like, and polycarboxylic acids such as polymethacrylic acid and the like.

Still another example includes stimulation of the concentration change of the dispersion. For example, the stimulation includes the case where the concentration of the aqueous dispersion is changed by evaporation or absorption of water in the aqueous dispersion, or by the change of the concentration of the polymer dissolved in the aqueous dispersion. In the stimulation, it is preferable that the concentration change falls within a phase transition-causing concentration and therearound, and more preferably, it is the critical gelling concentration and therearound. The response to the stimulation of concentration change of solution includes, for example, responsiveness in relation to hydrogen bond, hydrophobic interaction or phase transition (sol-gel transition, liquid crystallization). Examples of the polymer are alkoxyvinyl ether derivatives such as poly(2-methoxyethyl vinyl ether) and poly(2-ethoxyethyl vinyl ether) and the like, aryloxyvinyl ether derivatives such as poly(2-phenoxyethyl vinyl ether) and the like, or copolymers which contain such polymer compounds as a main ingredient.

In the aqueous dispersion of the present invention, two or more such stimulations may be combined.

A polymer having polyvinyl ether structure in the stimuli-responsive aqueous dispersion, which contains the polymer having polyvinyl ether structure, water and a solid particle, may be a homopolymer but is preferably a copolymer comprising two or more components of vinyl ether for optimizing the properties of the polymer. More preferably, the copolymer is a block polymer, a graft polymer or a gradient polymer in order to bring out the best performance of stimulation-responsiveness of each monomer component which comprises the polymer.

The function of stimulation-responsiveness is achieved by the polymer having polyvinyl ether structure, but, in the present invention, any other polymer may be used together in order to further enhance the function. In one example, the stimulation-responsiveness is given to a polymer other than a polymer having polyvinyl ether structure, whereas a different function (for example, a function of enhancing dispersion stability) is given to the polymer having polyvinyl ether structure.

Other examples of stimuli-responsive polymers are described below, however the present invention is not limited thereto.

The first example is a polymer in which, when heat is added, the composition of the dispersion changes and thus phase transition occurs. The polymer of the type includes, for example, poly-N-alkyl-substituted (meth)acrylamides such as poly(meth)acrylamide, poly-N-isopropyl(meth) acrylamide poly-N-vinylisobutylamide, poly(meth)acrylic acid and its metal salts; poly-2-hydroxyethyl (meth)acrylate, poly-N-(meth)acrylpipendine, poly(2-ethyloxazoline), polyvinyl alcohol and its partially saponified derivatives, polyethylene oxide, polyethylene oxide-polypropylene oxide copolymer, poly(ethylene glycol monomethacrylate), poly (ethylene glycol monoacrylate); substituted cellulose derivatives such as methyl cellulose, ethyl cellulose, hydroxyethyl cellulose, hydroxypropyl cellulose; and copolymers and polymer blends in which these polymer compounds are a main component.

The second examples include a polymer in which the structure of the polymer changes through photoreaction caused by exposure to electromagnetic waves, whereby the composition of the aqueous dispersion changes and phase transition occurs. One example of the polymer of the type is a polymer compound having a group such as a photochromic group. It includes many compounds, and specifically, for example, it includes (meth)acrylamides, poly-N-alkyl-substituted (meth)acrylamides such as poly-N-isopropyl(meth) acrylamide, and N-vinylisobutylamides, which have a group such as triphenylmethane derivatives being ionically cleavable by irradiation of light, spiropyran derivatives or spiroxazine derivatives, or the like.

The third example is a polymer in which the composition of the aqueous dispersion changes by pH change, and thus phase transition occurs. The specific example of the polymer includes, for example, poly(meth)acrylic acid and its metal salts, polyvinylsulfonic acid, polyvinylbenzenesulfonic acid, poly(meth)acrylamidoalkylsulfonic acids, polymaleic acid and its metal salts, or copolymers containing monomer components that are elements of these polymer compounds, as main component; polyvinyl alcohol-polyacrylic acid composite and its metal salts, poly(ethylene glycol monomethacrylate), metal salts of carboxymethyl cellulose, metal salts of carboxyethyl cellulose, and copolymers and polymer blends which contain these polymer compounds as main component.

The fourth example is a polymer in which phase transition occurs by changing the concentration of the polymer dissolved in the aqueous dispersion. The polymer of the type includes, for example, an aqueous solution of a polymer compound such as poly(meth)acrylamide, poly-N-alkyl-substituted (meth)acrylamides, polyvinyl methyl ether or polymethacrylic acid having lowest critical solubility temperature (LCST) (JP-B 7948/1986, JP-A 237426/1991, JP-A 82809/1996), as well as polyvinyl alcohol, polyvinyl alcohol-polyacrylic acid composite and its metal salts, poly (ethylene glycol monomethacrylate), inorganic polymers such as alkoxysiloxanes, and copolymers and polymer blends which contain these polymer compounds as main component.

A polymer having polyvinyl ether structure in the stimuli-responsive aqueous dispersion, which contains the polymer having polyvinyl ether structure, water and a solid particle, may be a copolymer composed of vinyl ether and any other polymer. More preferably, the copolymer is a block polymer, a graft polymer or a gradient polymer in order to bring out the best performance of stimulation-responsiveness of each monomer component which comprises the polymer.

Of those copolymers, a block polymer or a graft polymer is preferably used. They can almost completely retain the properties of the repeat unit constructed from blocks or units, and the properties are exhibited while each property coexists. In particular, in these polymers, the stimuli-responsive blocks or units effectively function, and the block polymer would exhibit its function more efficiently compared with a random polymer. It is believed that the block polymer or the graft polymer in the aqueous dispersion will enhance the dispersibility of the solid particle in the aqueous solvent. For this purpose, a polymer in which a part of the polymer is compatible to the aqueous solvent is used. Also, the polymer having polyvinyl ether structure may have a variety of block configurations including AB, ABA, ABC or ABCD type (D is a block of which the structure differs from those of A, B and C, and it may be hydrophilic or hydrophobic), as described above, and it preferably has two or more different hydrophilic blocks.

A polymer other than the polymer having polyvinyl ether structure (for example, the stimuli-responsive polymer mentioned above) is added to the stimuli-responsive aqueous dispersion that contains a polymer having polyvinyl ether structure, water and a solid particle, thereby being able to give or enhance the stimulation-responsiveness.

Though not specifically being limited, the molecular structure of the repeating units of the polymer having polyvinyl ether structure in the stimuli-responsive aqueous dispersion, as described above, is preferably represented by the following general formula (1):

$$—(CH_2—CH(OR^1))— \quad (1)$$

wherein $R^1$ is selected from a linear, branched or cyclic alkyl group having from 1 to 18 carbon atoms, a phenyl (Ph) group, a pyridyl (Pyr) group, or a group of Ph—Ph, Ph-Pyr, —(CH($R^2$)—CH($R^3$)—O)$_l$—$R^4$ and —(CH$_2$)$_m$—(O)$_n$—$R^4$; the hydrogen atom on the aromatic ring may be substituted with a linear or branched alkyl group having from 1 to 4 carbon atoms; and the carbon atom in the aromatic ring may be substituted with a nitrogen atom. l is an integer 1 to 18; m is an integer 1 to 36; and n is 0 or 1. $R^2$ and $R^3$ each independently represent H or CH$_3$. $R^4$ represents H, a linear, branched or cyclic alkyl group having from 1 to 18 carbon atoms, Ph, Pyr, Ph—Ph, Ph-Pyr, —CHO, —CH$_2$CHO, —CO—CH=CH$_2$, —CO—C(CH$_3$)=CH$_2$, or CH$_2$COOR$^5$, and when $R^4$ is a substituent other than hydrogen, the hydrogen atom on the carbon atom of the substituent may be substituted with a linear or branched alkyl group having from 1 to 4 carbon atoms or with F, Cl or Br, and the carbon atom in the aromatic ring of the substituent may be substituted with a nitrogen atom. $R^5$ represents H, or an alkyl group having from 1 to 5 carbon atoms.

Preferably, $R^1$ is selected from a linear, branched or cyclic alkyl group having from 1 to 18 carbon atoms, —(CH($R^2$)—CH($R^3$)—O)$_l$—$R^4$ or —(CH$_2$)$_m$—(O)$_n$—$R^4$; l and m each independently is 1 to 12; n is 0 or 1; $R^2$ and $R^3$ are each independently H or CH$_3$; $R^4$ is H, a linear, branched or cyclic alkyl group having from 1 to 6 carbon atoms, Ph, Pyr, Ph—Ph, Ph-Pyr, —CHO, —CH$_2$CHO, —CO—CH=CH$_2$, —CO—C(CH$_3$)=CH$_2$, or CH$_2$COOR$^5$; when $R^4$ is a substituent other than hydrogen, the hydrogen atom on the carbon atom of the substituent may be substituted with a linear or branched alkyl group having from 1 to 4 carbon atoms or with F, Cl or Br, and the carbon atom in the aromatic ring of the substituent may be substituted with a nitrogen atom; $R^5$ is H, or an alkyl group having from 1 to 5 carbon atoms.

In the present invention, the linear or branched alkyl group includes, for example, methyl, ethyl, n-propyl, i-propyl, n-butyl, sec-butyl, tert-butyl, pentyl, n-hexyl, heptyl, octyl, nonyl, decyl, undecyl, dodecyl and octadecyl groups. The cyclic alkyl group includes, for example, cyclopropyl, cyclobutyl, cyclopentyl, cyclohexyl and cyclooctyl groups. When hydrogen atom on the carbon atom is substituted, substitution may occur at one or more positions.

Also preferably, the molecular structure of the repeating units of the polymer having polyvinyl ether structure in the stimuli-responsive aqueous dispersion is represented by the following general formula (2):

$$—(CH_2—CH(OR^6))— \quad (2)$$

wherein $R^6$ is selected from a linear, branched or cyclic alkyl group having from 1 to 18 carbon atoms, Ph, Pyr, Ph—Ph, Ph-Pyr, —(CH$_2$—CH$_2$—O)$_l$—$R^7$ or —(CH$_2$)$_m$—(O)$_n$—$R^7$; the hydrogen atom on the aromatic ring may be substituted with a linear or branched alkyl group having from 1 to 4 carbon atoms; and the carbon atom in the aromatic ring may be substituted with a nitrogen atom. l is an integer 1 to 18; m is an integer 1 to 36; and n is 0 or 1. $R^7$ represents H, a linear, branched or cyclic alkyl group having from 1 to 18 carbon atoms, Ph, Pyr, Ph—Ph, Ph-Pyr, —CHO, —CH$_2$CHO, —CO—CH=CH$_2$, —CO—C(CH$_3$)=CH$_2$, or CH$_2$COOR$^8$, and when $R^7$ is a substituent other than hydrogen, the hydrogen atom on the carbon atom of the substituent may be substituted with a linear or branched alkyl group having from 1 to 4 carbon atoms or with F, Cl or Br, and the carbon atom in the aromatic ring of the substituent may be substituted with a nitrogen atom. $R^8$ represents H, or an alkyl group having from 1 to 5 carbon atoms.

Preferably, $R^6$ is selected from a linear, branched or cyclic alkyl group having from 1 to 18 carbon atoms, Ph, Pyr, Ph—Ph, Ph-Pyr, —(CH$_2$—CH$_2$—O)$_l$—$R^7$ or —(CH$_2$)$_m$—(O)$_n$—$R^7$; the hydrogen atom on the aromatic ring may be substituted with a linear or branched alkyl group having from 1 to 4 carbon atoms, and the carbon atom in the aromatic ring may be substituted with a nitrogen atom; l is 1 to 18; m is 1 to 36; n is 0 or 1; $R^7$ is H, a linear, branched or cyclic alkyl group having from 1 to 18 carbon atoms, Ph, Pyr, Ph—Ph, Ph-Pyr, —CHO, —CO—CH=CH$_2$ or —CO—C(CH$_3$)=CH$_2$; when $R^7$ is a substituent other than hydrogen, the hydrogen atom on the carbon atom of the substituent may be substituted with a linear or branched alkyl group having from 1 to 4 or with F, Cl or Br, and the carbon atom in the aromatic ring of the substituent may be substituted with a nitrogen atom.

Preferred examples of the molecular structure of the repeating units of the polymer having polyvinyl ether structure in the stimuli-responsive aqueous dispersion described above are mentioned below. However, the polyvinyl ether structures of the present invention are not limited thereto.

(I-a)

(I-b)

(I-c)

(I-d)

(I-e)

(I-f)

(I-g)

-continued

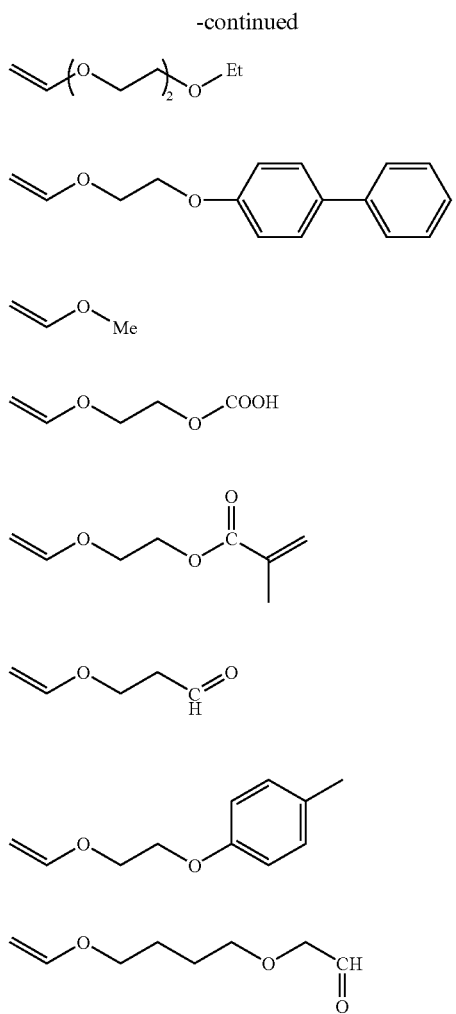

(I-h)
(I-i)
(I-j)
(I-k)
(I-l)
(I-m)
(I-n)
(I-o)

Stimulation-responding polymers having polyvinyl ether structures composed of any of the vinyl ether monomers mentioned above are preferably used in the present invention. However, the polymer used in the present invention is not limited to the stimulation-responding polymers having polyvinyl ether structures composed of any of the above-mentioned vinyl ether monomers. In the case where the polymer having polyvinyl ether structure is a copolymer comprising two or more monomer components, the polymer may be any of a random polymer, a block polymer, a gradient polymer or a graft polymer. Some examples of the polymer are described below. However, the polymer used in the present invention is not limited thereto.

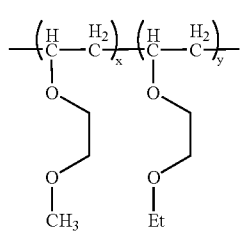

(II-a)

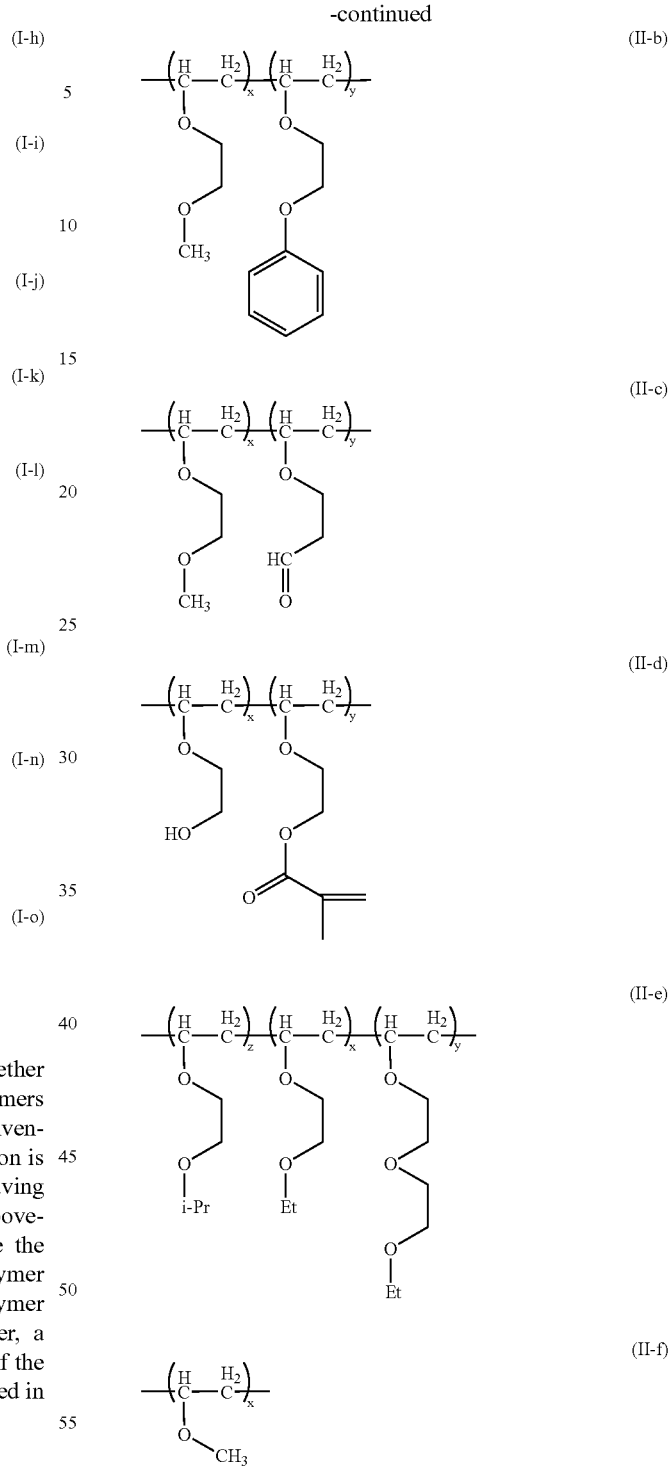

(II-b)
(II-c)
(II-d)
(II-e)
(II-f)

The number of the repeating units of polyvinyl ether (indicated by x, y and z in formulae (II-a) to (II-f) described above) independently is preferably 1 to 10,000; and the sum of the repeating units (indicated by (x+y+z) in formulae (II-a) to (II-f) is more preferably 10 to 40,000.

Also preferably, the polymer used in the present invention has an oxyalkylene structure in at least a part of the side chains.

Next described are the other components of the aqueous dispersion of the present invention.

[Water]

Water in the aqueous dispersion of the present invention is preferably ion-exchanged water not containing metal ions, pure water, or ultra-pure water.

[Aqueous Solvent]

For the aqueous solvent, for example, usable are polyalcohols such as ethylene glycol, diethylene glycol, triethylene glycol, polyethylene glycol, propylene glycol, polypropylene glycol, glycerin; polyalcohol ethers such as ethylene glycol monomethyl ether, ethylene glycol monoethyl ether, ethylene glycol monobutyl ether, diethylene glycol monoethyl ether, diethylene glycol monobutyl ether; and nitrogen-containing solvents such as N-methyl-2-pyrrolidone, substituted pyrrolidones, triethanolamine. For accelerating the drying speed of the aqueous dispersion on recording media, usable are monohydric alcohols such as methanol, ethanol, isopropyl alcohol.

In the case where the aqueous dispersion of the present invention is ink, the content of the water or aqueous solvent is preferably in a range of 20 to 95% by weight, more preferably 30 to 90% by weight based on the total weight of the aqueous dispersion.

[Solid Particle]

Depending on the use of the aqueous dispersion of the present invention, the solid particle in the aqueous dispersion may be selected from pigments, metals, herbicides, insecticides or biological materials such as medicines. The solid particle preferably is an amount of 0.1 to 50% by weight based on the total weight of the aqueous dispersion.

In ink of the preferred embodiment of the aqueous dispersion of the present invention, a pigment is typically used as the solid particle. Specific examples of pigment and dye are described below, which may be employed in the case where the aqueous dispersion of the present invention may be used as ink.

Any organic pigments and inorganic pigments may be used, and pigments used in ink are preferably black pigments and pigments of three primary colors of cyan, magenta and yellow. Color pigments other than mentioned above, colorless or pale-color pigments, and pigments having a metallic luster may also be used. Pigments newly prepared for the present invention may be also usable. Examples of commercially-available black, cyan, magenta and yellow pigments are mentioned below.

Black pigments are, not limited to, Raven 1060, Raven 1080, Raven 1170. Raven 1200, Raven 1250, Raven 1255, Raven 1500, Raven 2000, Raven 3500, Raven 5250, Raven 5750, Raven 7000, Raven 5000 ULTRAII, Raven 1190 ULTRAII (all by Columbia Carbon); Black Pearls L. MOGUL-L, Regal 400R, Regal 660R, Regal 330R, Monarch 800, Monarch 880, Monarch 900, Monarch 1000, Monarch 1300, Monarch 1400 (all by Cabot); Color Black FW1, Color Black FW2, Color Black FW200, Color Black 18, ColorBlack S160, Color Black S170, Special Black 4, Special Black 4A, Special Black 6, Printex 35, Printex U, Printex 140U, Printex V, Printex 140V (all by Dexxa); No. 25, No. 33, No. 40, No. 47, No. 52. No. 900, No. 2300, MCF-88, MA600. MA7, MA8, MA100 (all by Mitsubishi Chemical) and the like.

Cyan pigments are, not limited to, C.I. Pigment Blue-1, C.I. Pigment Blue-2, C.I. Pigment Blue-3, C.I. Pigment Blue-15, C.I. Pigment Blue-15:2, C.I. Pigment Blue-15:3, C.I. Pigment Blue-15:4, C.I. Pigment Blue-16, C.I. Pigment Blue-22, C.I. Pigment Blue-60 and the like.

Magenta pigments are, not limited to, C.I. Pigment Red-5. C.I. Pigment Red-7, C.I. Pigment Red-12, C.I. Pigment Red-48, C.I. Pigment Red-48:1, C.I. Pigment Red-57, C.I. Pigment Red-112, C.I. Pigment Red-122, C.I. Pigment Red-123, C.I. Pigment Red-146, C.I. Pigment Red-168, C.I. Pigment Red-184, C.I. Pigment Red-202, C.I. Pigment Red-207 and the like.

Yellow pigments are, not limited to, C.I. Pigment Yellow-12, C.I. Pigment Yellow-13, C.I. Pigment Yellow-14, C.I. Pigment Yellow-16, C.I. Pigment Yellow-17, C.I. Pigment Yellow-74, C.I. Pigment Yellow-83. C.I. Pigment Yellow-93, C.I. Pigment Yellow-95, C.I. Pigment Yellow-97, C.I. Pigment Yellow-98, C.I. Pigment Yellow-114. C.I. Pigment Yellow-128, C.I. Pigment Yellow-129, C.I. Pigment Yellow-151, C.I. Pigment Yellow-154 and the like.

In the aqueous dispersion of the present invention, self-dispersible pigments in water are also usable. As the water-dispersible pigments, there are pigments which adsorb a polymer on their surface and thus use its steric hindrance, and which use electrostatic repulsion force. Commercial products of the pigments are CAB-0-JET200, CAB-0-JET300 (both by Cabot), and Microjet Black CW-1 (by Orient Chemical) and the like.

Preferably An the amount of the pigment is from 0.1 to 50% by weight based on the weight of the ink. If the pigment content is less than 0.1% by weight, sufficient image density could not be obtained, and if it is greater than 50% by weight, image fixation may go bad. A more preferable range of the pigment content is 0.5% by weight to 30% by weight.

A known dye may be used in the ink of the present invention, including, for example, water-soluble dyes such as direct dyes, acid dyes, basic dyes, reactive dyes, and insoluble disperse dyes containing dyes for foods. These are mentioned below.

For example, water-soluble dyes are:

direct dyes such as C.I. Direct Black, -17, -19, -22, -32, -38, -51, -62, -71, -108, -146, -154;

C.I. Direct Yellow, -12, -24, -26, -44, -86, -87, -98, -100, -130, -142;

C.I. Direct Red, -1, -4, -13, -17, -23, -28, -31, -62, -79, -81, -83, -89, -227, -240, -242, -243;

C.I. Direct Blue, -6, -22, -25, -71, -78, -86, -90, -106, -199;

C.I. Direct Orange, -34, -39, -44, -46, -60;

C.I. Direct Violet, -47, -48;

C.I. Direct Brown, -109;

C.I. Direct Green, -59; and the like;

acid dyes such as C.I. Acid Black, -2, -7, -24, -26, -31, -52, -63, -112, -118, -168, -172, -208;

C.I. Acid Yellow, -11, -17, -23, -25, -29, -42, -49, -61, -71;

C.I. Acid Red, -1, -6, -8, -32, -37, -51, -52, -80, -85, -87, -92, -94, -115, -180, -254, -256, -289, -315, -317;

C.I. Acid Blue, -9, -22, -40, -59, -93, -102, -104, -113, -117, -120, -167, -229, -234, -254;

C.I. Acid Orange, -7, -19;

C.I. Acid Violet, -49; and the like;

reactive dyes such as C.I. Reactive Black, -1, -5, -8, -13, -14, -23, -31, -34, -39;

C.I. Reactive Yellow, -2, -3, -13, -15, -17, -18, -23, -24, -37, -42, -57, -58, -64, -75, -76, -77, -79, -81, -84, -85, -87, -88, -91, -92, -93, -95, -102, -111, -115, -116, -130, -131, -132, -133, -135, -137, -139, -140, -142, -143, -144, -145, -146, -147, -148, -151, -162, -163;

C.I. Reactive Red, -3, -13, -16, -21, -22, -23, -24, -29, -31, -33, -35, -45, -49, -55, -63, -85, -106, -109, -111, -112, -113.

-114, -118, -126, -128, -130, -131, -141, -151, -170, -171, -174, -176, -177, -183, -184, -186, -187, -188, -190, -193, -194, -195, -196, -200, -201, -202, -204, -206, -218, -221;

C.I. Reactive Blue, -2, -3, -5, -8, -10, -13, -14, -15, -18, -19, -21, -25, -27, -28, -38, -39, -40, -41, -49, -52, -63, -71, -72, -74, -75, -77, -78, -79, -89, -100, -101, -104, -105, -119, -122, -147, -158, -160, -162, -166, -169, -170, -171, -172, -173, -174, -176, -179, -184. -190, -191, -194, -195, -198, -204, -211, -216, -217;

C.I. Reactive Orange, -5, -7, -11, -12, -13, -15, -16, -35, -45, -56, -62, -70, -72, -74, -82, -84, -87, -91, -92, -93, -95, -97, -99;

C.I. Reactive Violet, -1, -4, -5, -6, -22, -24, -33, -36, -38;

C.I. Reactive Green, -5, -8, -12, -15, -19, -23;

C.I. Reactive Brown, -2, -7, -8, -9, -11, -16, -17, -18, -21, -24, -26, -31, -32, -33; and the like; as well as, C.I. Basic Black, -2;
C.I. Basic Red, -1, -2, -9, -12, -13, -14, -27;
C.I. Basic Blue, -1, -3, -5, -7, -9, -24, -25, -26, -28, -29;
C.I. Basic Violet, -7, -14, -27;
C.I. Food Black, -1, -2; and the like.

The colorants mentioned above are especially favorable for the ink of the present invention, but the colorants to be used in the ink of the present invention are not limited to those mentioned above.

Preferably, an amount of the dye used in the ink of the present invention is from 0.1 to 50% by weight based on the weight of the ink. If the dye content is less than 0.1% by weight, sufficient image density could not be obtained; and if it is greater than 50% by weight, image fixation goes bad. More preferable dye content ranges from 0.5% by weight to 30% by weight.

A combination of dye and pigment may be used in the present invention.

[Additives]

The aqueous dispersion of the present invention may optionally contain various additives and auxiliaries One example of additives for the aqueous dispersion is a dispersion stabilizer that allows a pigment to be stably dispersed in solvent. The aqueous dispersion of the present invention has the function of dispersing a solid particle such as pigment in terms of a polymer having polyvinyl ether structure, but if dispersion of the solid particle is insufficient, other dispersion stabilizer may be added.

As other dispersion stabilizers, a resin or a surfactant that has both hydrophilic segments and hydrophobic segments may be used.

The resin having both hydrophilic segments and hydrophobic segments includes, for example, a copolymer of a hydrophilic monomer and a hydrophobic monomer. The hydrophilic monomer includes, for example, acrylic acid, methacrylic acid, maleic acid, fumaric acid, and monoesters of such carboxylic acids, vinylsulfonic acid, styrenesulfonic acid, vinyl alcohol, acrylamide, methacryloxyethyl phosphate or the like; and the hydrophobic monomer includes, for example, styrene, styrene derivatives such as α-methylstyrene, vinylcyclohexane, vinylnaphthalene derivatives, acrylates, and methacrylates or the like. Various types of copolymer may be used such as random, block or graft copolymers. Of course, both the hydrophilic monomers and the hydrophobic monomers are not limited to those mentioned above.

A surfactant may be used such as anionic, nonionic, cationic or ampholytic surfactants.

The anionic surfactant includes, for example, salts of fatty acids, salts of alkylsulfates, alkylarylsulfonates, alkyl-diarylether disulfonates, dialkylsulfosuccinates, alkylphosphates, naphthalenesulfonic acid-formalin condensates, salts of polyoxyethylene-alkylphosphates, and glycerol borate fatty acid esters.

The nonionic surfactant includes, for example, polyoxyethylene alkyl ethers, polyoxyethylene-oxypropylene block copolymers, sorbitan fatty acid esters, glycerin fatty acid esters, polyoxyethylene fatty acid esters, polyoxyethylene alkylamines, fluorine-containing surfactants, and silicon-containing surfactants.

The cationic surfactant includes, for example, alkylamine salts, quaternary ammonium salts, alkylpyridinium salts, and alkylimidazolium salts.

The ampholytic surfactant includes, for example, alkylbetaines, alkylamine oxides, and phosphatidyl choline. The surfactant is not also limited to those mentioned above.

In case where the composition of the present invention is used as an ink composition that contains a block polymer, it may contain a composition that comprises an additive (crosslinking agent) having the function of crosslinking the block polymer in the ink composition. The composition of the type is favorable for the ink composition of the present invention.

The crosslinking agent-containing composition as mentioned above may be provided as a separate composition from the ink composition of the present invention, and the two compositions may be contacted with each other in any desired time in use. Specifically, for inkjet ink for example, an ink tank filled with an ink composition of the present invention and an ink tank filled with a crosslinking agent-containing composition are separately prepared, and the two compositions are separately ejected from the respective tanks onto a recording medium on which the two may be contacted with each other. Alternatively, a crosslinking agent-containing composition is previously provided on a recording medium, and an ink composition of the present invention is ejected on the recording medium on which the two are contacted with each other.

Further, an aqueous solvent may optionally be added to the aqueous dispersion of the present invention. Especially for inkjet ink, the aqueous solvent is effective for preventing the ink from drying and solidifying around nozzles. One or more different types of aqueous solvents may be used alone or as a mixture. The aqueous solvent may be the same as those described above. For ink, a content of the aqueous solvent ranges preferably 0.1 to 60% by weight, more preferably 1 to 25% by weight based on the total amount of ink.

For example, in the case of using the composition as an ink, the other additives include a pH controlling agent that ensures the stabilization of ink and the stability of ink with the ink pipes in a recording apparatus; a penetrant having the ability to enhance ink penetration into recording media and to accelerate the apparent ink drying on them; an antifungal agent to prevent the development of fungi in ink; a chelating agent that sequesters metal ions in ink to thereby prevent deposition of metal around nozzles and prevent deposition of insoluble solids in ink; a defoaming agent that prevents ink from foaming during circulation, moving or at the time of production of the recording liquid; and also antioxidant, viscosity controlling agent, electrical conductive agent, UV absorbent, water-soluble dye, disperse dye, and oil-soluble dye.

Inkjet ink (aqueous dispersion ink) of a preferred embodiment of the ink composition of the present invention is described in detail below.

[Method for Producing Inkjet Ink]

The preparation method of the inkjet ink of the present invention, for example, comprises adding pigment and dispersion stabilizer to water and water-soluble solvent, dispersing them by the use of a dispersing machine, removing coarse particles by centrifugation, then adding water or solvent and additives thereto, stirring and mixing them, and filtering the resulting mixture.

The dispersing machine includes, for example, ultrasonic homogenizers, laboratory homogenizers, colloid mills, jet mills and ball mills, and one or more of these may be used alone or combination thereof.

In case where a self-dispersible pigment is used, ink compositions of the present invention may also be prepared in the same manner as mentioned above.

[Image-Forming Method and Image-Forming Apparatus]

The aqueous dispersion ink of the present invention can be used in various types of image-forming apparatus, such as inkjet printing, electrophotography and the like, and an image formation is done by an image formation method employing the apparatus.

In the case of using an aqueous dispersion of the present invention as inkjet ink, the aqueous dispersion may be used according to the following examples. The ink coagulates by the stimulation (a) to (d) mentioned below.

(a) In the case using ink responsive to temperature stimulation:

The difference between the temperature of the ink in an ink tank and the temperature of the ink adhered on a recording medium by ejecting becomes a cause of a thermal stimulation, whereby the phase change of inkjet ink of the present invention occurs and leads to rapid thickening or aggregation of insoluble components.

(b) In the case using ink responsive to electromagnetic wave stimulation:

The difference between the ink of the present invention in a dark chamber and the ink irradiated with visible light or electromagnetic waves emitted from the electromagnetic waves-emitting unit in an inkjet recording apparatus causes the polymerization of polymeric functional groups of the polymer in the inkjet ink of the present invention, whereby the phase change of inkjet ink of the present invention occurs and leads to rapid thickening or aggregation of insoluble components.

(c) In the case using ink responsive to pH change stimulation:

The pH of the ink in an ink tank differs from that of the ink adhered on a recording medium by the pH change of the ink according to an influence of the recording medium. Thus, the phase change of inkjet ink of the present invention occurs and leads to rapid thickening or aggregation of insoluble components.

(d) In the case using ink responsive to concentration change stimulation:

The difference between the concentration of the ink in an ink tank and that of the ink adhered on a recording medium is produced by evaporation of water or the aqueous solvent in the ink, or by absorption of them into the recording medium. The phase change of inkjet ink of the present invention occurs by the difference, and leads to rapid thickening or aggregation of insoluble components.

The change of the ink properties can decrease color blurring and feathering and provide excellent ink fixation. The changes of ink properties are not limited to only the thickening and the aggregation of insoluble components mentioned above.

Various methods can be employed for applying stimulation to the ink. One preferred method comprises mixing a stimulating composition with the stimuli-responsive ink or contacting it with the ink. For the pH-responsive ink of above (b) for example, an inkjet process may be applied as mixing the ink with a desired pH-controlling composition. As disclosed in JP-A 63185/1989, a stimulating composition may be ejected through an inkjet head onto the entire area of forming an image; or as disclosed in JP-A 216392/1996, the amount of the stimulating composition may be controlled to ensure better image formation.

The stimulating composition may double as an ink composition containing dye or pigment. For example, any ink of cyan-magenta-yellow-black (CMYK) inks used in a color inkjet process may be a stimulating ink, and any other ink of CMYK inks may be a stimuli-responsive ink to decrease the color blurring. Regarding the matter as to which of CMYK is a stimuli-responsive ink and which of other CMYK is a stimulating ink, there are various combinations of inks. In the present invention, any combination of inks is employable with no limitation on the selection. Regarding the type of the stimulating composition and the type of the stimuli-responsive inks, all the stimuli-responsive patterns mentioned above are employable in the present invention with no specific limitation thereon.

In one embodiment of the present invention, the stimulating composition to be used includes a composition that contains an additive having the function of crosslinking the block polymer in a block polymer-containing ink composition. Specifically, in one preferred embodiment of the image-forming method of the present invention, a stimuli-responsive ink composition which contains a block polymer, a solvent and a substance having a predetermined function is contacted with a composition which contains an additive (crosslinking agent) capable of crosslinking with the block polymer as the composition for stimulating the ink composition, whereby the ink composition is fixed on a recording medium to form a good image. In this, the substance having a predetermined function is preferably pigment. Specifically, the pigments mentioned above are represented as examples.

The block polymer in the ink composition is preferably amphiphilic; and the solvent is preferably water. In this type of composition, the block polymer forms micelles and disperses the pigment well. In that manner, since most of the block polymer does not dissolve in a molecular state but disperses in a micelle state, the ink composition of the present invention shows relatively low viscosity. For the block polymer, any of the polymers mentioned above are usable, but those having a polyvinyl ether structure are preferred. In the present invention, the ink composition is contacted with a composition that contains a crosslinking agent capable of reacting with a part of the block polymer or forming a complex with the block polymer, whereby the micelles form a network structure and the ink is thickened and exhibits sufficient image fixation. Accordingly, the image forming method of using the composition of the present invention has good fixability.

In the case where the inkjet ink composition of the present invention is contacted with the above-mentioned crosslinking agent-containing composition, the two compositions may be provided separately. For example, the inkjet ink composition and the crosslinking agent-containing composition are put into separate packages, and they may be contacted with each other at any desired time of use. One specific method of image formation in a case of employing inkjet ink comprises separately preparing an ink tank that contains an ink composition of the present invention and an ink tank that contains a crosslinking agent-containing composition, and separately ejecting the two compositions onto a recording medium on which they are contacted with each other to form an image. Another method comprises previously applying a crosslinking agent containing composition onto a recording medium by applying or spraying, and then ejecting an ink composition of the present invention onto the recording medium on which the two compositions are contacted with each other to form an image.

In the case where the composition of the present invention is contacted with such a crosslinking agent containing composition, when the concentration of the crosslinking agent may be increased or a polyfunctional crosslinking agent may be used, the composition of the present invention may be changed to a gel. In the image-forming method of the present invention that uses a crosslinking agent, a block polymer having polyvinyl ether structure is preferably used. Preferred monomers for producing the block polymer having polyvinyl ether structure include those of formulae (I-a) to (I-o) mentioned above. In one preferred embodiment in which the composition of the present invention is contacted with a crosslinking agent-containing composition, such a block polymer having polyvinyl ether structure is preferably used. The polymer includes the polymers of formulae (II-a) to (II-e) mentioned above.

For the ink composition which contains a block polymer having polyvinyl ether structure and which is preferably used in the present invention, a compound having carboxyl group as functionality is preferred for the crosslinking agent. This is because the carboxyl group of the crosslinking agent can readily interact with the side chains of oxyethyleneoxy structure units of the polymer, such as those of the structural examples of the polymer mentioned above, to form a complex. Since the compound having carboxyl group serves as a crosslinking agent, it is desirable that the compound has plural carboxyl groups. Therefore, the compound having carboxyl group includes, for example, dicarboxylic acids, tricarboxylic acids and polycarboxylic acids. Specific examples of the compound are low-molecular or high-molecular polyfunctional carboxylic acid compounds such as $HOOC-(CH_2)_p-COOH$, $HOOC-(CH_2)_pCH(COOH)(CH_2)_q-COOH$, polyacrylic acid, polymethacrylic acid, polymethyl acrylate-acrylic acid copolymer, polymethyl methacrylate-methacrylic acid copolymer. In these formulae, p is an integer from 1 to 40, and q is an integer from 1 to 40.

It is also desirable that a means for giving stimulation is previously provided to the recording media. For example, using an acid-responsive ink among the pH-responsive inks of the present invention, a record is performed on acid paper. In this case, the recording medium has the function of stimulating the stimuli-responsive ink of the present invention. The recording media of that type are within the scope of the present invention. Accordingly, the present invention relates to such recording media having the function of stimulating the stimuli-responsive ink of the present invention. The recording media of the present invention may be in any known form, for example, and it includes plain paper, thermal paper, and acid paper.

Inkjet printers using the inkjet ink of the present invention may include various inkjet recording apparatus, for example, a piezo-inkjet recording system using a piezoelectric element, or a thermal inkjet recording system in which the ink is bubbled by application of thermal energy and is ejected onto a recording medium to perform recording.

In the inkjet recording apparatus of the present invention, for example, the amount of the ink to be ejected through the orifices of the inkjet head preferably ranges between 0.1 picoliters and 100 picoliters.

For one embodiment of the inkjet recording apparatus, it comprises a means for contacting a stimuli-responsive ink composition that contains a block polymer, a solvent and a substance having a predetermined function, with a composition containing an additive (crosslinking agent) capable of crosslinking the block polymer as composition that stimulates the ink composition. In this embodiment, the two compositions are contacted with each other whereby the ink composition is fixed on a recording medium to form a sufficient image. A pigment is preferably used as the substance having a predetermined function. It includes the pigments as mentioned above.

In the ink composition of the present invention, it is preferable to use a composition containing a component wherein at least a part of polymer structure changes from hydrophobic to hydrophilic at a temperature of 20° C. or lower, more preferably 10° C. or lower.

The block polymer in the ink composition to be used in the inkjet recording apparatus of the present invention is preferably amphiphilic, and the solvent to be used therein is preferably water. In a composition of this type, the block polymer forms micelles well and disperses pigment well. In addition, most of the block polymer does not dissolve in a molecular state but disperses in a micelle state, whereby the ink composition of the present invention shows relatively low viscosity. For the block polymer, any of the polymers mentioned above are usable, but those having a polyvinyl ether structure are preferred. In the present invention, the ink composition is contacted with a composition that contains a crosslinking agent capable of reacting with a part of the block polymer or forming a complex with the block polymer, whereby the micelles form a network structure and the ink is thickened and exhibits sufficient image fixation. Accordingly, the image-forming apparatus using such composition of the present invention can provide good fixability.

In the inkjet recording apparatus of the present invention, the means for contacting the inkjet ink composition of the present invention with the above mentioned composition containing crosslinking agent is not restricted. For example, the two compositions may be provided separately, and may be contacted with each other at any desired time of use. For example, the inkjet ink composition and the crosslinking agent-containing composition are put into separate packages, and they may be contacted with each other at any desired time of use. In the case of the inkjet ink, for example, the means comprises separately preparing an ink tank that contains an ink composition of the present invention therein and an ink tank that contains a crosslinking agent-containing composition, transferring them into inkjet heads, and separately ejecting the two compositions onto a recording medium on which they are contacted with each other. Alternatively, there is the means which comprises previously applying a crosslinking agent-containing composition onto a recording medium by applying or spraying, and then ejecting an ink composition of the present invention onto the recording medium on which the two are contacted with each other.

In the case where the composition of the present invention is contacted with such a crosslinking agent-containing composition, when the concentration of the crosslinking agent may be increased or a polyfunctional crosslinking agent may be used, the composition of the present invention may be changed to gel. In the image-forming apparatus of the present invention that uses a crosslinking agent, preferably used is a block polymer having polyvinyl ether structure. Preferred monomers for producing the block polymer having polyvinyl ether structure include those of formulae (I-a) to (I-o) mentioned above. In one preferred embodiment in which the composition of the present invention is contacted with a crosslinking agent-containing composition, preferably used is such a block polymer having polyvinyl ether structure. The polymer includes the polymers of formulae (II-a) to (II-e) mentioned above.

For the ink composition which contains a block polymer having polyvinyl ether structure and which is preferably used in the apparatus of the present invention, a compound having carboxyl group as functionality is preferred for the crosslinking agent. This is because the carboxyl group of the crosslinking agent can readily interact with the side chains of oxyethyleneoxy structure units of the polymer, such as those of the structural examples of the polymer mentioned above, to form a complex. Since the compound having carboxyl group serves as a crosslinking agent, it is desirable that the compound has plural carboxyl groups. Therefore, the compound having carboxyl group includes, for example, dicarboxylic acids, tricarboxylic acids and polycarboxylic acids. Specific examples of the compound are low-molecular or high-molecular polyfunctional carboxylic acid compounds such as $HOOC-(CH_2)_p-COOH$, $HOOC-(CH_2)_pCH(COOH)(CH_2)_q-COOH$, polyacrylic acid, polymethacrylic acid, polymethyl acrylate-acrylic acid copolymer, polymethyl methacrylate-methacrylic acid copolymer. In these formulae, p is an integer from 1 and 40, and q is an integer from 1 and 40.

The aqueous dispersion ink of the present invention (that is, the ink composition of the present invention) may be used in an indirect recording apparatus in which the ink is applied onto an intermediate transfer medium and then a formed image thereon is transferred onto a recording medium such as paper. In addition, it may also be used in a direct recording apparatus that uses an intermediate transfer medium.

In particular, the ink composition of the present invention is favorable to an image-forming method and an image-forming apparatus of electrophotography. For example, the image-recording apparatus of the type comprises a photoconductor drum in order to form a latent image, a means (e.g., light exposure unit) for forming a latent image on the drum, an ink-releasing unit, a transfer mechanism, and a recording medium. For forming an image on the recording medium in the apparatus of the type, a latent image is formed on the photoconductor drum, then an ink composition of the present invention is applied to the latent image or to a part other than the latent image, and the resulting image is transferred and fixed on the recording medium by the transfer mechanism.

Next described is the outline of an inkjet recording apparatus with reference to FIG. 1. FIG. 1 shows one example of the configuration of an inkjet recording apparatus, and is not intended to restrict the scope of the present invention.

FIG. 1 is a block diagram showing an inkjet recording apparatus.

FIG. 1 is to illustrate a case of recording an image on a recording medium by moving the head in the ink jet recording apparatus 20. In FIG. 1, an X-direction driving motor 56 and a Y-direction driving motor 58, by which the head 70 is driven in X-Y directions, are connected to CPU 50 which controls the entire movement of the apparatus via an X-motor driving circuit 52 and a Y-motor driving circuit 54, respectively. According to the indication of the CPU, the X-direction driving motor 56 and the Y-direction driving motor 58 are driven via the X-motor driving circuit 52 and the Y-motor driving circuit 54, respectively, and the position of the head 70 relative to a recording medium is thereby determined.

As shown in FIG. 1, a head driving circuit 60 is connected to the head 70, in addition to the X-direction driving motor 56 and the Y-direction driving motor 58, and CPU 50 controls the head driving circuit 60, by which the head 70 is driven, that is, the ejection of inkjet ink and the like is done. In addition, an X-encoder 62 and a Y-encoder 64 that detect the head position are connected to CPU 50, and the position information of the head 70 is inputted into CPU 50. A control program is also inputted into the program memory 66. Based on the position information from the control program, the X-encoder 62 and the Y-encoder 64, the head 70 is moved to be located in a desired position on a recording medium, and ejects inkjet ink. In that manner, a desired image is recorded on the recording medium. In case where plural inkjet inks are loaded in the image-recording apparatus, the above-mentioned operation is repeated for every inkjet ink for a total of predetermined times to thereby record a desired image on a recording medium.

After the inkjet ink has been ejected, if desired, the head 70 may be moved to a position of a cleaning means (not shown) which removes the excess ink from the head 70, whereby the head 70 can be cleaned by wiping it. For cleaning the head, any conventional method may be used.

After an image recording is completed, the recorded medium is transferred by a transfer mechanism (not shown), and a new recording medium is set in the apparatus.

Within the scope and the sprit of the present invention, the embodiment of the present invention illustrated hereinabove may be modified or changed. For example, although the above illustrated embodiment mentioned, in which the head 70 is moved in X-Y direction is described, image recording may also be performed by moving the head in X-direction (or Y-direction) only and the recording medium in Y-direction (or X-direction) with linking of them to each other.

In the present invention, the head provides a superior result, which has a thermal energy-generating means (e.g., electro-thermal transducer, laser) for generating the thermal energy as the energy source for ejecting the inkjet ink, and which ejects the inkjet ink by the thermal energy. Specifically, in the system, fine and precise images can be formed. Superior image recording is achieved by using the inkjet ink of the present invention.

Regarding the configuration and the principle of a typical apparatus equipped with the thermal energy generating means, the basic principles disclosed, for example, in U.S. Pat. Nos. 4,723,129 and 4,740,796 are preferably used in carrying out the present invention. The system disclosed may apply to both on-demand type and continuous type, but especially it is effective for the on-demand type. This is because in the on-demand type, at least one driving signal, which gives rapid temperature increase that corresponds to ejection information and exceeds nucleate boiling, is applied to an electro-thermal transducer that holds a liquid and is located in accordance with a path, thereby to allow thermal energy to be generated and to cause film boiling on a heated surface of the head, and, as a result, bubbles corresponding to the driving signal in one-to-one are formed in liquid. With the growth and the contraction of the bubble, the liquid is ejected from openings for ejecting, and at least one droplet is formed. If the driving signal is pulse-shape, it is more preferable since the bubble growth and contraction may be attained suitably and immediately, the ejection of the liquid having superior responsiveness is achieved. For the pulse shaped driving signal, those described in U.S. Pat. Nos. 4,463,359 and 4,345,262 are preferred. When the condition described in U.S. Pat. No. 4,313,124, which is an invention relating to the rate of increase of the temperature of the heated surface, is adopted, more effective ejection is achieved.

Regarding the head configuration; a configuration described in U.S. Pat. Nos. 4,558,333 and 4,459,600 that disclose a configuration in which the heated surface is located at a bending portion, may be used in addition to a configuration of a combination of the ejection opening, the flow path of liquid and electro-thermal transducer as in the above-mentioned patent specifications, and is also within the scope of the present invention. In addition, the present invention has also effective results, when the invention adopts other constitutions that are based on JP-A 123670/1984 that discloses the configuration in which, for plural electro-thermal transducers, a common slit is used as an ejecting portion of the electro-thermal transducer, or on JP-A 138461/1984 that discloses the configuration in which an opening able to absorb the pressure waves of thermal energy corresponds to an ejecting portion. In other words, no matter what type of head is used, according to the present invention an inkjet ink is ejected reliably and efficiently.

Further, the present invention is also conveniently applied to the head of a full-line type having the length corresponding to the maximum width of recording media in the image-forming apparatus of the present invention. The head of this type may have a configuration in which plural head units are combined to satisfy the intended length of the head, or the head may be integrated as one head.

Still further, the present invention is also effective in serial-type apparatus where the head is fixed to the body of the image-forming apparatus, or where the head is an exchangeable chip-type one which may be, when mounted on the body of the image-forming apparatus, electrically connected to the body and supplied with ink from the body.

The apparatus of the present invention may be provided with a means for removing a liquid drop. Provided with it, much better ejecting effect is achieved Addition of any preliminarily auxiliary means is preferable since they further stabilize the effect of the present invention. Specifically, the additional preliminary means includes a capping for head means; a pressure or suction means; an electro-thermal transducer or other heating elements, or a means for pre-heating comprising a combination of these; and a pre-ejecting means for ejection different from a means for ejecting ink.

The most effective apparatus for the present invention is one which is able to realize the above-mentioned film boiling manner.

The present invention can provide the apparatus having a good dispersion stability. In particular, the present invention can provide the apparatus having good dispersion stability at a temperature of 20° C. or lower, especially 10° C. or lower.
p The means for providing the apparatus having good dispersion stability at a temperature of 20° C. or lower, and preferably 10° C. or lower, is to use a component which contains a polymer in which at least apart of the structure of the polymer changes from the state that is compatible with a solvent to the state that is incompatible with a solvent at a temperature of 20° C. or lower, and preferably 10° C. or lower.

EXAMPLES

The present invention is described in more detail with reference to the following Examples, to which, however, the present invention is not limited. The following Examples demonstrate a synthetic method of block polymer having polyvinyl ether structure for use in the present invention and preparation of pigment dispersion ink as an example of an aqueous dispersion. In these examples of block polymer and pigment dispersion ink shown below, only specific examples among those exactly practiced are described. Accordingly, the present invention is not limited to the specific examples.

<Preparation of Polymer>

Preparation of Monomers:

2-Methoxyethyl vinyl ether (hereinafter referred to as MOVE) and 2-ethoxyethyl vinyl ether (hereinafter referred to as EOVE) were prepared by refluxing 2-chloroethyl vinyl ether and sodium methoxide or sodium ethoxide in the presence of tetrabutylammonium iodide as catalyst, (H. J. Schneider, U.S. Pat. No. 3,062,892 (1962)). 2-Vinyloxyethyl methacrylate (hereinafter referred to as VEM) was prepared by Williamson reaction.

1) Preparation of Random Polymer of MOVE and VEM:

Preparation of Random Polymer:

A glass container equipped with a three-way cock was purged with nitrogen, and heated under nitrogen atmosphere at 250° C. to remove the adsorbed water. This was allowed to return to room temperature, and 21.8 mmols of MOVE, 2.2 mmols of VEM, 16 mmols of ethyl acetate, 0.1 mmols of 1-isobutoxyethyl acetate, and 11 ml of toluene were added to the container. When the temperature of the reactant reached 0° C., 0.2 mmols of ethylaluminium sesquichloride was added to initiate polymerization thereby to obtain a random polymer composed of MOVE and VEM. The molecular weight of the polymer was monitored at a given interval using gel permeation chromatography (GPC), and 0.3 wt % ammonia/methanol solution was added to the system to stop the polymerization. After the reaction was completed. dichloromethane was added to the reaction mixture thereby to dilute the mixture, and the mixture was washed three times with 0.6 N HCl solution and then three times with distilled water, concentrated to dryness using an evaporator, and dried under vacuum to give a random polymer composed of MOVE and VEM which is a target compound. The compound was identified by NMR and GPC, both of which gave satisfactory spectra. The number-average molecular weight (hereinafter referred to as Mn); $Mn=2.7 \times 10^4$; and the molecular weight distribution (hereinafter referred to as Mn/Mw), Mn/Mw—1.3.

2) Preparation of AB Diblock Polymer of MOVE and EOVE (an External Stimulation: Temperature Change):

Preparation of Monomers:

The monomers are prepared the same way as described in above 1).

Production of AB Diblock Polymer:

A glass container equipped with a three-way cock was purged with nitrogen, and heated under nitrogen atmosphere at 250° C. to remove the adsorbed water. This was allowed to return to room temperature and 12 mmols of MOVE, 16 mmols of ethyl acetate, 0.1 mmols of 1-isobutoxyethyl acetate, and 11 ml of toluene were put into it. When the temperature of the reactant reached 0° C., 0.2 mmols of ethylaluminium sesquichloride was added to initiate polymerization thereby to synthesize a component A of AB block polymer. The molecular weight of the polymer was monitored at a given interval using gel permeation chromatography (GPC). After the polymerization of the component A was completed, 12 mmols of EOVE that is a component B was added and polymerization was continued. The polymerization was stopped by adding 0.3 wt %. ammonia/methanol solution to the system. After the reaction was completed, dichloromethane was added to the reaction mixture thereby to dilute the mixture, and the mixture was washed three times with 0.6 N HCl solution and then three times with distilled water, concentrated to dryness using an evaporator, and dried under vacuum to give an intended MOVE-EOVE diblock polymer. The compound was identified through NMR and GPC, both of which gave satisfactory spectra. $Mn=2.5\times10^4$; $Mn/Mw=1.3$.

3) Production of AB Diblock Polymer of MOVE and VEM (External Stimulation: Light and Heat):

Production of AB Diblock Polymer;

A glass container equipped with a three-way cock was purged with nitrogen, and heated under nitrogen atmosphere at 250° C. to remove the adsorbed water. This was allowed to return to room temperature, and 12 mmols of MOVE, 16 mmols of ethyl acetate, 0.1 mmols of 1-isobutoxyethyl acetate, and 11 ml of toluene were added to the container. When the temperature of the reactant reached 0° C., 0.2 mmols of ethylaluminium sesquichloride was added to initiate polymerization thereby to obtain a component A of AB block polymer. The molecular weight of the polymer was monitored at a given interval using gel permeation chromatography (GPC), After the polymerization of the component A was completed, 12 mmols of VEM that is a component B was added and polymerization was continued. The polymerization was stopped by adding 0.3 wt % ammonia/methanol solution to the system. After the reaction was completed, dichloromethane was added to the reaction mixture thereby to dilute the mixture, and the mixture was washed three times with 0.6 N HCl solution and then three times with distilled water, concentrated to dryness using evaporator, and dried under vacuum to give an intended MOVE-VEM diblock polymer. The compound was identified through NMR and GPC, both of which gave satisfactory spectra. $Mn=2.6\times10^4$; $Mn/Mw$ 1.3.

Other block polymers were prepared in the same manner.

<Preparation of Pigment Dispersion Ink of the Present Invention>

Example 1

[Method of Preparing Inkjet Ink of the Present Invention]

This Example demonstrates the preparation of black ink only. Other color inks can be prepared in the same manner as shown in below, except that the composition of the pigment is changed to the respective color pigment.

Pigment, polymer having polyvinyl ether structure, and diethylene glycol were added to ion-exchanged water, and dispersed with an ultrasonic homogenizer. The dispersion was centrifuged (20,000 rpm×20 min) to remove coarse particles, and the pigment dispersion was obtained.

To the above pigment dispersion were added a suitable amount of aqueous solvent, ion-exchanged water and additives, and filtered through a 1 μm-filter under pressure thereby to prepare inkjet ink (total amount, 100 parts).

Using the pigment dispersion prepared as above, various stimuli-responsive inks were prepared.

(a) Inkjet Ink Responsive to a Stimulation of Concentration Change:

According to the method of preparing inkjet ink as above, inkjet ink (a) having the composition mentioned below was prepared.

TABLE 1

| Ingredient | Content (parts by weight) |
| --- | --- |
| Carbon black (Cabot's MOGUL L) | 5 |
| MOVE-b-EOVE prepared in above 2) (MOVE:EOVE = 1:1, Mw/Mn = 1.3) | 4 |
| Diethylene glycol | 4 |
| Polyethylene glycol #400 | 2 |
| Surfactant (Pluronic PE3100, by BASF) | 0.2 |
| Ion-exchange water | balance |
| Total | 100 |

(b) Inkjet Ink Responsive to a Stimulation of pH Change;

According to the method of preparing inkjet ink as above, inkjet ink (b) was prepared using the same composition as that of the inkjet ink of above (a) responsive to concentration change.

(c) Inkjet Ink Responsive to a Stimulation of Temperature Change:

According to the method of inkjet ink production as above, inkjet ink (c) was prepared using the same composition as that of the inkjet ink of above (a) responsive to concentration change.

(d) Inkjet Ink Responsive to a Stimulation of Electromagnetic Waves:

According to the method of inkjet ink production as above, inkjet ink (d) was prepared using the composition mentioned below.

TABLE 2

| Ingredient | Content (parts by weight) |
| --- | --- |
| Carbon black (Raven 1080, by Columbia Carbon) | 5 |
| MOVE-ran-VEM* prepared in above 1) (MOVE:VEM = 10:1, Mw/Mn = 1.3) | 4 |
| Diethylene glycol | 10 |
| Polyethylene glycol #400 | 2 |
| Surfactant (Pluronic PE3100, by BASF) | 0.2 |
| Ion-exchange water | balance |
| Total | 100 |

*ran is an abbreviation of random polymer.

Comparative Example 1

[Method of Preparing Inkjet Ink Containing Self-Dispersible Pigment]

According to the same manner as in Example 1 (except that a polymer having polyvinyl ether structure was not used), inkjet ink was prepared using the composition mentioned below.

TABLE 3

| Ingredient | Content (parts by weight) |
|---|---|
| Self-dispersible pigment (CAB-O-JET300, by Cabot) | 5 |
| Diethylene glycol | 4 |
| Polyethylene glycol #400 | 2 |
| Surfactant (Nonion E-230, by Nippon Yushi) | 0.2 |
| Ion-exchange water | balance |

<Ink Bulk Characteristic>

The bulk characteristics of the above inks (a), (b) and (c) are described below.

After being cooled to 10° C., 15 parts by weight of block polymer MOVE-b-EOVE was added to 100 parts by weight of the ink (a), and dissolved. This was heated up to 45° C., and it rapidly thickened and gelled. It is thought that this will be because, at low temperatures, the EOVE blocks are hydrophilic and the block polymer entirely dissolved in the solvent, but when heated up to 45° C., the EOVE blocks were changed to hydrophilic and gelled. This means that the block polymer MOVE-b-EOVE exhibits good dispersion at 45° C. when its concentration is low, whereas the block polymer was caused to change to gel at that temperature when its concentration is high.

When the pH of the ink (b) was adjusted to 3 by adding an aqueous solution of 5 wt % polyacrylic acid having a pH of 2 to the ink (b), then a black color precipitation appears, and a gel is also generated partly. It is thought that this will be because the complex of the carboxylic acid moiety of polyacrylic acid with the block polymer is formed.

At room temperature, carbon black is well dispersed in the ink (c), but when heated up to 85° C., the black color precipitation is formed. It is thought that this will be because the MOVE blocks of the block polymer changed to hydrophobic at the elevated temperature and the pigment dispersibility in the ink was thereby lowered.

<Print Test>

Example 2

The inkjet inks prepared in Example 1 and Comparative Example 1 were tested for fixation strength. The inkjet inks of Example 1 and Comparative Example 1 were respectively charged in the print head of an EPSON Stylus COLOR 900 printer (by EPSON), and an image was recorded on plain paper using the printer.

Evaluation was carried out by pressing another white plain paper on the recording area of the printed paper under the weight of $4.9 \times 10^4$ N/m$^2$, and checking as to whether or not ink is adhered on the white plain paper.

(a) Evaluation of Inkjet Ink Responsive to Stimulation Caused by Concentration Change:

In printing with the inkjet ink on paper, the printing is performed under heating of an area receiving an ejected ink from the inkjet printer at about 40° C.

Evaluation of Fixation Strength:

No ink adhesion on the white plain paper was observed.

It is thought that this will be because the aqueous solvent was evaporated, or was absorbed by the recording medium, and, as a result, the concentration of MOVE-b-EOVE exceeded the critical phase transition concentration to cause phase transition.

(b) Evaluation of Inkjet Ink Responsive to Stimulation Caused by pH Change:

In printing with the inkjet ink of the present invention, the recording medium of plain paper was previously sprayed with an aqueous solution of 5 wt % polyacrylic acid having a pH of 4, thereby to make the recording paper capable of providing stimulation. The printing is performed on this recording medium in the same manner as above.

Evaluation of Fixation Strength:

No ink adhesion on the white plain paper was observed.

It is thought that this will be because the polymer MOVE-b-ROVE formed a complex with the polyacrylic acid.

(c) Evaluation of Inkjet Ink Responsive to Stimulation Caused by Temperature Change:

In printing with the inkjet ink of the present invention on paper, the printing is performed under heating an area receiving an ejected ink from the inkjet printer at about 80° C.

Evaluation of Fixation Strength:

No ink adhesion on the white plain paper was observed.

It is thought that this will be because phase transition of MOVE-b-EOVE occurred by heating at 80° C.

(d) Evaluation of Inkjet Ink Responsive to Stimulation Caused by Electromagnetic Waves:

In the printing using the inkjet ink of the present invention, after printing, the recording medium was exposed to 254 nm UV radiation.

Evaluation of Fixation Strength:

No ink adhesion on the white plain paper was observed.

It is thought that this will be because the polymerizable functional group of VEM contained in the ink was polymerized by irradiation of UV radiation.

Comparative Example 2

Evaluation of Inkjet Ink Employing Self-Dispersible Pigment:

A printing was carried out using the inkjet ink prepared in Comparative Example 1.

Compared with the inkjet ink of the present invention of Example 1, it took a longer time to dry the ink.

Evaluation of Fixation Strength:

Ink adhesion on the white plain paper was observed.

Example 3

An ink was prepared using the same composition as in Example 1, except for employing C.I. Food Black 2 that is a water-soluble dye in place of carbon black in the Example 1. The ink was tested and evaluated by making it respond to the stimulation caused by pH change which was described in Example 2, b). The good result is obtained as shown in Example 2, b).

Example 4

A cyan ink with pH 3 or more was prepared using the following composition which employed cyan dye C.I. Basic Blue 75.

TABLE 4

| Ingredient | Content (parts by weight) |
|---|---|
| Diethylene glycol | 10 |
| Isopropyl alcohol | 2 |
| Urea | 5 |
| Polyacrylic acid | 4 |
| Cyan dye, C.I. Basic Blue 75 | 3 |
| 1 N HCl solution | 3 |
| Ion-exchange water | balance |
| Total | 100 |

Using the prepared ink as cyan ink and the black ink (a) of Example 1, a stripe pattern of cyan and black was printed on plain paper with Canon's printer, BJC-600J. The printing is carried out under the same condition using an ink attached to a BJC-600J printer. The printed samples were evaluated visually. The result was that the degree of color blurring in the samples printed with the inks of the present invention was lower than that in the samples printed with the ink attached to the BJC-600J printer.

Example 5

An inkjet ink using the composition of Table 1 was prepared except for employing block polymer, MOVE-b-VEM prepared in the above 3). In the same manner as in Example 2, the printing test was performed for the responsiveness to the stimulation caused by pH change. That is, the recording medium of plain paper was previously sprayed with an aqueous solution of 5 wt % polyacrylic acid having a pH of 4, thereby to make the recording paper capable of providing stimulation. The inkjet printing is performed on this recording medium in the same manner as above. The same fixability as in the previous Examples is observed.

The following Examples illustrate in more detail the printing by contacting of the composition of the present invention with a stimulating composition. However, the present invention is not limited thereto.

Example 6

5 parts by weight of pigment (Cabot's MOGUL L), 4 parts by weight of the above AB block polymer of MOVE-b-VEM (Mn-2.6×10$^4$, Mn/Mw=1.3), and 4 parts by weight of diethylene glycol were added to 87 parts by weight of ion-exchanged water, and dispersed with an ultrasonic homogenizer. The resulting dispersion was centrifuged (20,000 rpm×20 min) to remove coarse particles, thereby giving the pigment dispersion.

The pigment dispersion was filtered through a 1 μm-filter under pressure to give inkjet ink.

The stimulating compositions were prepared as shown below.

(i) 6 parts by weight of adipic acid, 5 parts by weight of diethylene glycol and 89 parts by weight of ion-exchanged water were mixed to prepare a stimulating composition.

(ii) 3 parts by weight of polymethacrylic acid, 5 parts by weight of diethylene glycol and 92 parts by weight of ion-exchange water were mixed to prepare a stimulating composition.

<Print Test>

Example 7

Using the inkjet ink prepared in Example 6, the stimulating compositions (i) and (ii), the Evaluation of fixation strength was performed.

The inkjet ink and the stimulating compositions (i) and (ii) were respectively charged in the printing head of Canon's BJF800, and printing onto a plain paper was performed. The inkjet ink and compositions (i) and (ii) were ejected in the same area of 1 cm$^2$ and printed. The ink fixation in that printed area was evaluated.

Evaluation was carried out by pressing another white plain paper on the recording area of the printed paper after 1 minute under the weight of 4.9×10$^4$ N/m$^2$, and checking as to whether or not ink is adhered on the white plain paper.

Ink Fixation Evaluation:

No ink adhesion on the white plain paper was observed.

<Bulk Characteristics of the Stimuli-Responsive Ink and the Crosslinking Agent-Containing Compositions>

One ml of the ink of Example 6 was mixed with 1 ml of each of the compositions (i) and (ii). A significant thickening in both of the two mixtures is observed. In particular, a gel was generated in the mixture of the ink of Example 6 with the composition (ii).

<Evaluation of Dispersion Stability>

Example 8

Dispersion stability of the ink composition prepared was evaluated. The ink using the composition shown in Table 1 was employed for the evaluation. The evaluation is performed by allowing the ink to stand in a constant temperature bath at 20° C. and 10° C., and visually observing the dispersion state after 40 days. As a result, the ink composition of the present invention generated no precipitation, and the superior dispersion stability is shown at a low temperature.

The present invention has been described in detail with respect to preferred embodiments, and it will now be apparent from the foregoing to those skilled in the art that changes and modifications may be made without departing from the present invention in its broader aspects, and it is the intention, therefore, in the appended claims to cover all such changes and modifications as fall within the true spirit of the present invention.

What is claimed is:

1. A composition having a stimulation-responsiveness, comprising a polymer, a solvent, and a substance having a predetermined function, wherein:
    said polymer is a block polymer consisting of polyvinyl ether with a repeating unit of the formula (CH$_2$—CH(OR$^1$)) where R$^1$ has an oxyalkylene structure;
    said polymer has two or more different hydrophilic blocks;
    said polymer changes its property by stimulation under the state of composition.

2. The composition as claimed in claim 1, wherein said solvent is water or an aqueous solvent.

3. The composition as claimed in claim 1, wherein said substance having a predetermined function is at least one of pigment or dye.

4. The composition as claimed in claim 1, wherein said polymer contains, in at least a part of the polymer structure, a component that has a structure capable of changing from the state incompatible with solvent to the state compatible with solvent or from the state compatible with solvent to the state incompatible with solvent at a given temperature.

5. The composition as claimed in claim 1, wherein said polymer has the function of dispersing the substance having a predetermined function.

6. The composition as claimed in claim 1, wherein said stimulation-responsiveness is the property that a phase change occurs by responding to stimulation.

7. The composition as claimed in claim 1, wherein said stimulation-responsiveness is at least one of properties selected from the property of changing a condition by responding to a temperature change, the property of changing a condition by responding to irradiation of electromagnetic waves, the property of changing a condition by responding to a pH change of the composition, or the property of changing a condition by responding to a concentration change of the composition.

8. The composition as claimed in claim 1, wherein a repeating unit structure of a polyvinyl ether structure in said polymer is represented by the following formula (1):

(1)

wherein $R^1$ is selected from a group of —(CH($R^2$)—CH($R^3$)—O)$_l$—$R^4$ or —(CH$_2$)$_m$—(O)$_n$—$R^4$; l and m are each independently selected from integers of from 1 to 12; n is or 1; $R^2$ and $R^3$ each independently represent H or CH$_3$; $R^4$ represents H, a linear, branched or cyclic alkyl group having from 1 to 6 carbon atoms, phenyl (Ph), pyridyl (Pyr), Ph, Pyr, Ph-Ph, Ph-Pyr, —CHO, —CH$_2$CHO, —CO—CH=CH$_2$, —CO—C(CH$_3$)=CH$_2$, or —CH$_2$COOR$^5$, and when $R^4$ is a substituent other than hydrogen, the hydrogen atom on the carbon atom of the substituent may be substituted with a linear or branched alkyl group having from 1 to 4 carbon atoms or with F, Cl or Br, and the carbon atom in the aromatic ring of the substituent may be substituted with a nitrogen atom; $R^5$ represents H, or an alkyl group having from 1 to 5 carbon atoms.

9. The composition as claimed in claim 1, which further comprises a surfactant.

10. A composition having a stimulation-responsiveness, comprising a polymer, a solvent, and a substance having a predetermined function, wherein said polymer is a block polymer having two or more different hydrophilic blocks, said polymer changes its property by stimulation under the state of composition; said polymer is a block polymer consisting of polyvinyl ether with a repeating unit of the formula (CH$_2$—CH(OR$^1$)) where $R^1$ has an oxyalkylene structure; and at least a part of said polymer has the function of changing from hydrophobic to hydrophilic by responding to a temperature change, and a solubility of the composition is increased by the temperature change, whereby a dispersibility of a dispersed material is stabilized.

* * * * *

UNITED STATES PATENT AND TRADEMARK OFFICE
CERTIFICATE OF CORRECTION

PATENT NO. : 7,056,972 B2
APPLICATION NO. : 10/100913
DATED : June 6, 2006
INVENTOR(S) : Ikuo Nakazawa et al.

It is certified that error appears in the above-identified patent and that said Letters Patent is hereby corrected as shown below:

COLUMN 3:
Line 25, "do does" should read --do--.
Line 34, "Accordingly" should read --Accordingly,--.

COLUMN 4:
Line 52, "ink-ejecting" should read --an ink-ejecting--.
Line 63, "temperature" should read --temperature of--.

COLUMN 5:
Line 33, "insecticides:" should read --insecticides;--.

COLUMN 6:
Line 11, "medicines" should read --medicines,--.
Line 55, "intention," should read --invention,--.

COLUMN 7:
Line 49, "poly condensation" should read --polycondensation--.

COLUMN 8:
Line 19, "viscosity" should read --viscosity,--.

COLUMN 10:
Line 55, "vinylether)-b-(2-ethoxyethylvinyl" should read --vinyl ether)-b-(2-ethoxyethyl vinyl--.
Line 65, "transition." should read --transition,--.

COLUMN 11:
Line 65, "acrylamide" should read --acrylamide;--.
Line 67, "poly-N-(meth)acrylpipendine," should read --poly-N-(meth)acrylpiperidine,--.

COLUMN 17:
Line 53, "L." should read --L,--.
Line 58, "ColorBlack" should read --Color Black--.
Line 61, "No. 52." should read --No. 52,--.
Line 62, "MA600." should read --MA600,--.

COLUMN 18:
Line 26, "An" should be deleted.

UNITED STATES PATENT AND TRADEMARK OFFICE
CERTIFICATE OF CORRECTION

PATENT NO. : 7,056,972 B2
APPLICATION NO. : 10/100913
DATED : June 6, 2006
INVENTOR(S) : Ikuo Nakazawa et al.

It is certified that error appears in the above-identified patent and that said Letters Patent is hereby corrected as shown below:

COLUMN 19:
Line 37, "auxiliaries" should read --auxiliaries.--.

COLUMN 23:
Line 5, "agent containing" should read --agent-containing--.

COLUMN 27:
Line 8, "configuration;" should read --configuration,--.
Line 43, "achieved" should read --achieved.--.
Line 60, "p" should be deleted.
Line 63, "apart" should read --a part--.

COLUMN 28:
Line 41, "completed." should read --completed,--.
Line 51, "—" should read --=--.

COLUMN 29:
Line 20, "Polymer;" should read --Polymer:--.
Line 32, "(GPC)," should read --(GPC).--.
Line 40, "using" should read --using an--.

COLUMN 32:
Line 13, "b-BOVE" should read --b-EOVE--.

COLUMN 33:
Line 49, "Mn-" should read --Mn=--

COLUMN 34:
Line 57, "blocks;" should read --blocks; and--.

COLUMN 35:
Line 27, "is or" should read --is--.

UNITED STATES PATENT AND TRADEMARK OFFICE
CERTIFICATE OF CORRECTION

PATENT NO. : 7,056,972 B2 Page 3 of 3
APPLICATION NO. : 10/100913
DATED : June 6, 2006
INVENTOR(S) : Ikuo Nakazawa et al.

It is certified that error appears in the above-identified patent and that said Letters Patent is hereby corrected as shown below:

<u>COLUMN 36</u>:
Line 2, "Ph, Pyr," should be deleted.

Signed and Sealed this

First Day of May, 2007

JON W. DUDAS
*Director of the United States Patent and Trademark Office*